US012580613B2

(12) United States Patent
Paidimarri et al.

(10) Patent No.: US 12,580,613 B2
(45) Date of Patent: Mar. 17, 2026

(54) ARBITRARY SPATIAL FILTERS BASED ON BEAM TRANSFORMATION

(71) Applicant: International Business Machines Corporation, Armonk, NY (US)

(72) Inventors: Arun Paidimarri, South Salem, NY (US); Bodhisatwa Sadhu, Peekskill, NY (US); John Francis Bulzacchelli, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 18/433,687

(22) Filed: Feb. 6, 2024

(65) Prior Publication Data

US 2025/0253904 A1 Aug. 7, 2025

(51) Int. Cl.
*H04B 7/0456* (2017.01)

(52) U.S. Cl.
CPC ................................. *H04B 7/0465* (2013.01)

(58) Field of Classification Search
None
See application file for complete search history.

(56) References Cited

U.S. PATENT DOCUMENTS

| | | | |
|---|---|---|---|
| 3,400,405 A | * | 9/1968 | Patterson, Jr. ....... H01Q 3/2682 |
| | | | 343/754 |
| 3,597,045 A | * | 8/1971 | Mathisen ............... G02B 27/46 |
| | | | 359/476 |
| 4,246,548 A | * | 1/1981 | Rutz ......................... H01S 5/14 |
| | | | 372/50.12 |

(Continued)

FOREIGN PATENT DOCUMENTS

| | | | | |
|---|---|---|---|---|
| CA | 2268366 C | * | 1/2006 | .......... H04M 11/062 |
| CA | 2268360 C | * | 3/2006 | ........... H04L 5/0046 |

(Continued)

OTHER PUBLICATIONS

B. Sadhu et al., "A 28-GHz 32-Element TRX Phased-Array IC With Concurrent Dual-Polarized Operation and Orthogonal Phase and Gain Control for 5G Communications," in IEEE Journal of Solid-State Circuits, vol. 52, No. 12, pp. 3373-3391, Dec. 2017, doi: 10.1109/JSSC.2017.2766211. 20 pages.
A. Valdes-Garcia et al., "A Fully Integrated 16-Element Phased-Array Transmitter in SiGe BiCMOS for 60-GHz Communications" in IEEE Journal of Solid-State Circuits, vol. 46, No. 5, May 2011 doi: 10.1109/JSSC.2010.2074951. 18 pages. http://www.researchgate.net/publication/220365677.

(Continued)

*Primary Examiner* — Berhanu Tadese
(74) *Attorney, Agent, or Firm* — SCULLY, SCOTT, MURPHY & PRESSER, P.C.; Kimberly Zillig

(57) ABSTRACT

Systems and methods for operating phased arrays are described. A circuit can receive an index associated with an antenna among a plurality of antennas in a phased array. The circuit can use the index to identify at least a phase value and a gain value of a known beam. The circuit can receive at least one static configuration of the antenna and at least one beam transformation parameter. The circuit can transform, based on the at least one beam transformation parameter and the at least one static configuration, the phase and gain values of the known beam into phase and gain values of a desired beam. The circuit can map the phase value of the desired beam to a phase shifter setting of the antenna and the gain value of the desired beam to a variable gain amplifier setting of the antenna to generate the desired beam.

20 Claims, 13 Drawing Sheets

(56) References Cited

U.S. PATENT DOCUMENTS

| | | | | |
|---|---|---|---|---|
| 4,489,322 | A * | 12/1984 | Zulch | G01S 13/867 |
| | | | | 342/149 |
| 4,613,933 | A * | 9/1986 | Shaw | H02M 7/53806 |
| | | | | 363/55 |
| 5,339,086 | A | 8/1994 | Deluca et al. | |
| 7,142,821 | B1 * | 11/2006 | Mohuchy | H01Q 9/27 |
| | | | | 343/893 |
| 7,991,065 | B2 | 8/2011 | Wallace et al. | |
| 8,325,417 | B1 * | 12/2012 | Kurti | G02B 19/0028 |
| | | | | 359/483.01 |
| 8,391,394 | B2 * | 3/2013 | Yeon | H04B 7/0447 |
| | | | | 375/267 |
| 8,599,946 | B2 * | 12/2013 | Kim | H04B 7/0469 |
| | | | | 375/267 |
| 8,618,983 | B2 | 12/2013 | Chen et al. | |
| 8,625,712 | B2 * | 1/2014 | Yeon | H04B 7/0619 |
| | | | | 375/267 |
| 8,724,219 | B1 * | 5/2014 | Wardlaw | G02B 27/28 |
| | | | | 359/483.01 |
| 8,861,635 | B2 * | 10/2014 | Wang | H04B 7/086 |
| | | | | 375/267 |
| 8,964,866 | B2 * | 2/2015 | Ko | H04B 7/065 |
| | | | | 375/267 |
| 9,042,017 | B1 * | 5/2015 | Wardlaw | G02B 27/09 |
| | | | | 359/483.01 |
| 9,119,061 | B2 * | 8/2015 | Mohamadi | H04B 7/1555 |
| 9,160,433 | B2 | 10/2015 | Liu et al. | |
| 9,571,316 | B2 | 2/2017 | Kim et al. | |
| 9,774,382 | B2 * | 9/2017 | Mohamadi | H04B 7/1555 |
| 9,812,775 | B2 * | 11/2017 | Zahavi | H01Q 3/20 |
| 9,954,563 | B2 * | 4/2018 | Woodsum | H01Q 15/0086 |
| 9,966,670 | B1 * | 5/2018 | Kuo | H01Q 21/064 |
| 10,243,593 | B2 | 3/2019 | Pipon | |
| 10,422,742 | B2 * | 9/2019 | Safai | G01N 21/3554 |
| 10,460,429 | B1 | 10/2019 | Pinkus et al. | |
| 10,484,059 | B2 * | 11/2019 | Faxér | H04B 7/066 |
| 10,656,081 | B2 * | 5/2020 | Safai | G01N 25/72 |
| 10,812,166 | B2 * | 10/2020 | Kim | H04L 25/03343 |
| 10,866,313 | B2 * | 12/2020 | Gassend | G01S 17/931 |
| 10,976,420 | B2 * | 4/2021 | Gassend | G02B 27/0006 |
| 10,985,819 | B1 * | 4/2021 | Durbin | H04B 7/0617 |
| 10,998,949 | B2 * | 5/2021 | Faxér | H04B 7/0452 |
| 11,005,581 | B1 | 5/2021 | Gomadam et al. | |
| 11,081,792 | B2 | 8/2021 | Jain et al. | |
| 11,101,842 | B2 * | 8/2021 | Hormis | H04B 7/086 |
| 11,171,697 | B2 | 11/2021 | Fodor et al. | |
| 11,205,858 | B1 * | 12/2021 | Durbin | H01Q 3/28 |
| 11,237,256 | B2 * | 2/2022 | Marx | G01S 7/4815 |
| 11,296,764 | B2 * | 4/2022 | Hormis | H04B 7/15528 |
| 11,300,958 | B2 * | 4/2022 | Gassend | G05D 1/0094 |
| 11,395,061 | B2 | 7/2022 | Kagoshima | |
| 11,404,779 | B2 | 8/2022 | Mobarak et al. | |
| 11,411,641 | B2 * | 8/2022 | Hormis | H04B 7/086 |
| 11,525,892 | B2 * | 12/2022 | Gassend | G01S 7/4817 |
| 11,545,950 | B2 * | 1/2023 | Saha | H03G 3/3047 |
| 11,567,180 | B2 * | 1/2023 | Marx | G01S 17/42 |
| 11,569,879 | B2 * | 1/2023 | Faxér | H04B 7/066 |
| 11,588,523 | B2 * | 2/2023 | Khoshnevisan | H04L 5/0048 |
| 11,656,358 | B2 * | 5/2023 | Gassend | G01S 7/4817 |
| | | | | 356/5.01 |
| 11,664,862 | B2 * | 5/2023 | Hindy | H04B 7/084 |
| | | | | 370/329 |
| 11,728,858 | B1 * | 8/2023 | Durbin | H04B 7/0617 |
| | | | | 375/299 |
| 11,779,302 | B2 * | 10/2023 | Dagdeviren | A61B 8/4488 |
| | | | | 600/459 |
| 11,789,123 | B2 * | 10/2023 | Gassend | G02B 5/0252 |
| | | | | 356/5.01 |
| 11,792,833 | B2 * | 10/2023 | Hormis | H04L 25/022 |
| | | | | 370/315 |
| 11,811,146 | B2 * | 11/2023 | Hormis | H04B 1/04 |
| 11,815,587 | B2 * | 11/2023 | Astrom | G01S 15/08 |
| 11,824,807 | B2 | 11/2023 | Yi et al. | |

| | | | | |
|---|---|---|---|---|
| 11,863,145 | B1 * | 1/2024 | Celedon | H03G 3/3068 |
| 11,864,225 | B2 | 1/2024 | Zhang et al. | |
| 11,867,841 | B2 * | 1/2024 | Marx | G01S 7/4815 |
| 11,881,929 | B2 * | 1/2024 | Hormis | H04B 7/086 |
| 12,046,830 | B2 * | 7/2024 | Fujii | H01Q 3/36 |
| 12,061,296 | B2 * | 8/2024 | Gassend | G01S 17/931 |
| 12,117,565 | B2 * | 10/2024 | Marx | G01S 7/481 |
| 12,130,389 | B2 * | 10/2024 | Gassend | G01S 17/42 |
| 12,178,636 | B2 * | 12/2024 | Dagdeviren | A61B 8/4488 |
| 12,321,175 | B2 * | 6/2025 | Gassend | G01S 17/89 |
| 2005/0238111 | A1 | 10/2005 | Wallace et al. | |
| 2010/0073233 | A1 * | 3/2010 | Young | H01Q 21/064 |
| | | | | 342/373 |
| 2011/0064156 | A1 * | 3/2011 | Kim | H04B 7/0469 |
| | | | | 375/267 |
| 2011/0116515 | A1 * | 5/2011 | Van Houtum | H04L 1/006 |
| | | | | 370/479 |
| 2016/0211906 | A1 * | 7/2016 | Woodsum | H04B 1/16 |
| 2017/0187109 | A1 | 6/2017 | Wang et al. | |
| 2020/0382088 | A1 * | 12/2020 | Saha | H03H 7/21 |
| 2022/0045772 | A1 * | 2/2022 | El-Hassan | H04W 52/42 |
| 2022/0247471 | A1 * | 8/2022 | van Houtum | H04B 7/0842 |
| 2023/0075523 | A1 | 3/2023 | Paidimarri et al. | |
| 2023/0189267 | A1 | 6/2023 | Saggar et al. | |
| 2023/0247444 | A1 | 8/2023 | Cozzo et al. | |
| 2023/0362847 | A1 | 11/2023 | Ly et al. | |
| 2023/0413309 | A1 * | 12/2023 | Hormis | H04L 25/0202 |
| 2024/0049150 | A1 * | 2/2024 | Yang | H04W 52/42 |
| 2025/0030466 | A1 | 1/2025 | Paidimarri et al. | |
| 2025/0253904 | A1 * | 8/2025 | Paidimarri | H04B 7/0465 |

FOREIGN PATENT DOCUMENTS

| | | | | | |
|---|---|---|---|---|---|
| CN | 102201886 | A | * | 9/2011 | H04B 7/0417 |
| CN | 101945060 | B | * | 1/2013 | |
| CN | 102201886 | B | * | 3/2014 | H04B 7/0456 |
| CN | 108259059 | A | * | 7/2018 | H01Q 21/064 |
| CN | 110447146 | A | * | 11/2019 | H04B 1/3827 |
| CN | 108259059 | B | * | 3/2020 | H04B 1/40 |
| CN | 112039493 | A | * | 12/2020 | H03G 1/0023 |
| CN | 113475007 | A | * | 10/2021 | H04B 7/0617 |
| CN | 109660325 | B | * | 11/2021 | H04L 27/2071 |
| CN | 113785497 | A | * | 12/2021 | H04W 72/541 |
| CN | 113875167 | A | * | 12/2021 | H04B 7/2041 |
| CN | 116018761 | A | * | 4/2023 | H04L 5/0053 |
| CN | 113785497 | B | * | 8/2023 | H04B 7/15542 |
| CN | 116865816 | A | * | 10/2023 | H04B 7/15542 |
| CN | 112039493 | B | * | 4/2024 | H03H 11/16 |
| CN | 113475007 | B | * | 4/2024 | H04B 7/155 |
| CN | 113875167 | B | * | 5/2024 | H04B 7/2041 |
| CN | 118473490 | A | * | 8/2024 | H04B 7/2041 |
| DE | 10121790 | B4 | * | 11/2006 | G06F 8/71 |
| DE | 69937432 | T2 | * | 8/2008 | H04L 5/1438 |
| DE | 102020113967 | A1 | * | 12/2020 | H03H 11/20 |
| EP | 0187282 | A2 | * | 7/1986 | H02M 7/53806 |
| EP | 0981222 | A2 | * | 2/2000 | H04M 11/062 |
| EP | 0981242 | A2 | * | 2/2000 | H04M 11/062 |
| EP | 0981222 | B1 | * | 10/2007 | H04L 5/0053 |
| EP | 0981242 | B1 | * | 10/2008 | H04M 11/062 |
| EP | 2067276 | B1 | * | 3/2018 | H04B 7/0469 |
| EP | 4443941 | A1 | * | 10/2024 | H04W 24/02 |
| FI | 120567 | B | * | 11/2009 | H04N 21/6377 |
| JP | 2000134178 | A | * | 5/2000 | H04L 5/0053 |
| JP | 2000138733 | A | * | 5/2000 | H04M 11/062 |
| JP | 2002344658 | A | * | 11/2002 | H04L 5/14 |
| JP | 2008542768 | A | * | 11/2008 | H01Q 21/29 |
| JP | 4951622 | B2 | * | 6/2012 | H01Q 3/46 |
| KR | 20000016938 | A | * | 3/2000 | H04L 5/0046 |
| KR | 20000016939 | A | * | 3/2000 | H04M 11/062 |
| KR | 20140059295 | A | * | 5/2014 | H04B 7/0478 |
| KR | 20160079924 | A | * | 7/2016 | H04B 7/0478 |
| KR | 20210126479 | A | * | 10/2021 | H04L 1/0017 |
| KR | 20220010399 | A | * | 1/2022 | H04L 1/203 |
| KR | 20220021835 | A | * | 2/2022 | H04L 1/0016 |
| KR | 20220050597 | A | * | 4/2022 | H04W 72/542 |
| KR | 20240050323 | A | * | 4/2024 | H04B 17/336 |
| TW | 425808 | B | * | 3/2001 | H04M 11/062 |
| TW | 437224 | B | * | 5/2001 | H04L 5/0053 |
| TW | I602400 | B | * | 10/2017 | H01Q 3/30 |

(56)          References Cited

FOREIGN PATENT DOCUMENTS

| | | | | | |
|---|---|---|---|---|---|
| TW | 202406313 | A | * | 2/2024 | ........ H04W 72/1273 |
| WO | WO-2008002056 | A1 | * | 1/2008 | ........... H04B 10/297 |
| WO | WO-2008030035 | A2 | * | 3/2008 | ........... H04B 7/0469 |
| WO | WO-2010147443 | A2 | * | 12/2010 | ........... H04B 7/0447 |
| WO | WO-2011116542 | A1 | * | 9/2011 | ........... H04L 1/0003 |
| WO | WO-2012175636 | A1 | * | 12/2012 | ........ H03M 13/6325 |
| WO | WO-2014108768 | A1 | * | 7/2014 | ........... G06F 9/4843 |
| WO | WO-2018029645 | A2 | * | 2/2018 | ............ H04B 7/066 |
| WO | WO-2019180521 | A1 | * | 9/2019 | ........... H04L 9/0819 |
| WO | WO-2020176267 | A1 | * | 9/2020 | .............. H04B 7/10 |
| WO | WO-2020214488 | A1 | * | 10/2020 | ............ H04B 1/525 |
| WO | WO-2020227482 | A1 | * | 11/2020 | ........... H04B 7/088 |
| WO | WO-2020243188 | A1 | * | 12/2020 | ........... H04B 7/2041 |
| WO | WO-2021146060 | A1 | * | 7/2021 | ........... H04W 72/23 |
| WO | WO-2022015123 | A1 | * | 1/2022 | ........... H04L 5/0048 |
| WO | WO-2022035297 | A1 | * | 2/2022 | .............. H04L 1/20 |
| WO | WO-2023203467 | A1 | * | 10/2023 | ........... H04B 7/0639 |

OTHER PUBLICATIONS

Yan et al, "Topological spatial differentiation via complex amplitude filtering in Fourier space", Received Apr. 7, 2023; revised May 30, 2023; accepted May 31, 2023; posted Jun. 1, 2023; published Jun. 29, 2023. 5 pages.

Tesch et al, "Nonlinear Spatial Filtering in Multichannel Speech Enhancement", arXiv:2104.11033v1 [eess.AS] Apr. 22, 2021, 11 pages.

He et al, "GeoBeam: A distributed computing framework for spatial data",Computers and Geosciences vol. 131, Oct. 2019, pp. 15-22, 8 pages. https://doi.org/10.1016/j.cageo.2019.06.003.

Gaudio et al, "ExplainFix: Explainable Spatially Fixed Deep Networks", First published: Nov. 25, 2022. vol. 13, Issue2 Mar./Apr. 2023. 21 pages. https://wires.onlinelibrary.wiley.com/doi/10.1002/widm.1483.

Wong et al, "Event-Related Potential Responses To Task Switching Are Sensitive To Choice Of Spatial Filter",Frontiers in Neuroscience, Mar. 2018, vol. 12, Article 143. 16 pages.

A. Valdes-Garcia et al., "A Fully-Integrated Dual-Polarization 16-Element W-band Phased-Array Transceiver in SiGe BiCMOS" i978-1-4673-6062-3/13/$31.00 © 2013 IEEE, 4 pages.

B. Sadhu et al. "The More (Antennas), the Merrier: A Survey of Silicon-Based Mm-Wave Phased Arrays Using Multi-IC Scaling." IEEE Microwave Magazine 20.12 (2019), 19 pages.

Ahmadi Sassan, "5G NR: Architecture, Technology, Implementation, and Operation of 3GPP New Radio Standards," Elsevier, New Radio Access Physical Layer Aspects (Part 2), 2019, pp. 509-515.

Hassanieh et al., "Fast Millimeter Wave Beam Alignment", SIGCOMM '18: Proceedings of the 2018 Conference of the ACM Special Interest Group on Data Communication, Aug. 7, 2018, pp. 432-445.

Sayidmarie et al., "Synthesis of wide beam array patterns using random phase weights", IEEE International Conference on Electrical, Communication, Computer, Power, and Control Engineering, Dec. 2013, 07 pages.

* cited by examiner

1100

1102
Decompose spatial filter

1104
Select broadside beam

1106
Configure beam FIR filtering or linear combination of beams

1108
Configure beam steering

1110
Configure windowing

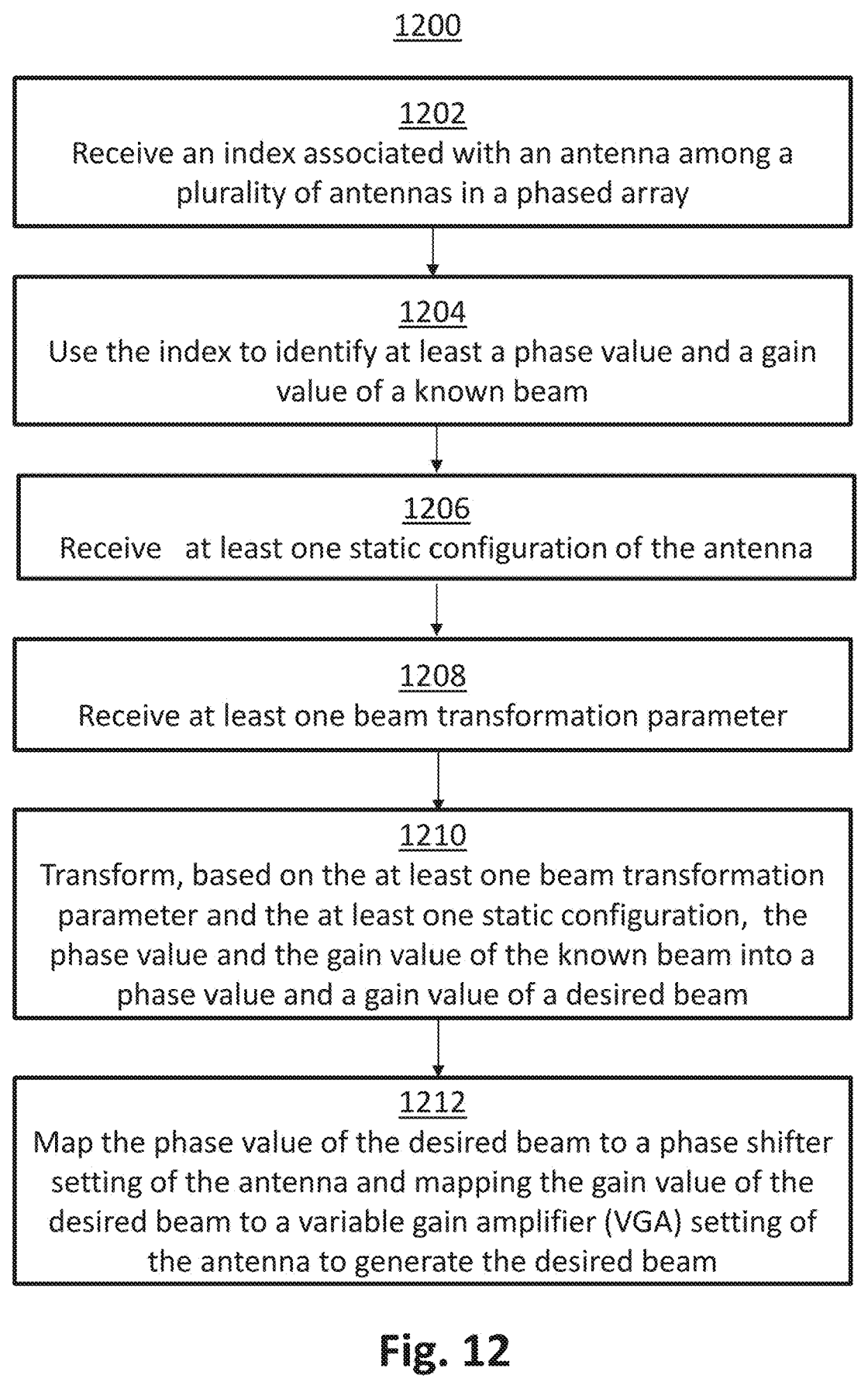

1200

```
┌─────────────────────────────────────────────────────────────┐
│                          1202                                │
│       Receive an index associated with an antenna among a    │
│          plurality of antennas in a phased array             │
└─────────────────────────────────────────────────────────────┘
                            │
                            ▼
┌─────────────────────────────────────────────────────────────┐
│                          1204                                │
│   Use the index to identify at least a phase value and a gain│
│                 value of a known beam                        │
└─────────────────────────────────────────────────────────────┘
                            │
                            ▼
┌─────────────────────────────────────────────────────────────┐
│                          1206                                │
│    Receive   at least one static configuration of the antenna│
└─────────────────────────────────────────────────────────────┘
                            │
                            ▼
┌─────────────────────────────────────────────────────────────┐
│                          1208                                │
│         Receive at least one beam transformation parameter   │
└─────────────────────────────────────────────────────────────┘
                            │
                            ▼
┌─────────────────────────────────────────────────────────────┐
│                          1210                                │
│   Transform, based on the at least one beam transformation   │
│     parameter and the at least one static configuration,  the│
│    phase value and the gain value of the known beam into a   │
│      phase value and a gain value of a desired beam          │
└─────────────────────────────────────────────────────────────┘
                            │
                            ▼
┌─────────────────────────────────────────────────────────────┐
│                          1212                                │
│  Map the phase value of the desired beam to a phase shifter  │
│   setting of the antenna and mapping the gain value of the   │
│   desired beam to a variable gain amplifier (VGA) setting of │
│       the antenna to generate the desired beam               │
└─────────────────────────────────────────────────────────────┘
```

Fig. 12

ARBITRARY SPATIAL FILTERS BASED ON BEAM TRANSFORMATION

FIELD

The present application relates to antennas, phased arrays, beamforming, integrated circuits and programs, and to computer-implemented methods and systems relating to phased array systems.

BACKGROUND

A phased array system may include a beam forming integrated circuit (IC) and a plurality of antennas. The phased array system may use a plurality of antenna signal paths, where each antenna signal path may have a variable time delay and/or phase and/or gain. For phase array systems being implemented as receivers (or receiver channels in a transceiver), the beam forming circuit may use propagation delay and/or phase produced by the variable time delay, and/or phase shifts produced by variable phase shifters and/or gain produced by variable gain amplifiers in each antenna signal path of signals being received by the phased array so that higher receiver gain is achieved for signals arriving from a specific direction. For phase array systems being implemented as transmitters (or transmission channels in a transceiver), the beam forming circuit may control time delay differences and/or phase shift differences and/or gain differences between successive antenna signal paths of the plurality of antennas to generate an electromagnetic beam having specific direction. The beam forming IC may use the changes in the time delay difference and/or phase shift difference and/or gain differences to steer the electromagnetic beam to different directions.

SUMMARY

In one embodiment, a method for operating a phased array is generally described. The method can include receiving an index associated with an antenna among a plurality of antennas in a phased array. The method can further include using the index to identify at least a phase value and a gain value of a known beam. The method can further include receiving at least one static configuration of the antenna. The method can further include receiving at least one beam transformation parameter. The method can further include transforming, based on the at least one beam transformation parameter and the at least one static configuration, the phase value and the gain value of the known beam into a phase value and a gain value of a desired beam. The method can further include mapping the phase value of the desired beam to a phase shifter setting of the antenna and mapping the gain value of the desired beam to a variable gain amplifier (VGA) setting of the antenna to generate the desired beam.

In one embodiment, an integrated circuit for operating a phased array is generally described. The integrated circuit can include a beam dictionary, a mapper and a circuit. The beam dictionary can be configured to store beam settings of a plurality of known beams. The mapper can be connected to an antenna among a phased array. The circuit can be configured to receive an index that identifies a location of a beam setting in the beam dictionary. The beam setting identified by the index can include at least a phase value and a gain value of a known beam. The circuit can be further configured to receive at least one static configuration of the antenna. The circuit can be further configured to receive at least one beam transformation parameter, The circuit can be further configured to transform, based on the at least one beam transformation parameter and the at least one static configuration, the phase value and the gain value of the known beam into a phase value and a gain value of a desired beam. The circuit can be further configured to send the phase value and the gain value of the desired beam to the mapper. The mapper can be configured to map the phase value of the desired beam to a phase shifter setting of the antenna and map the gain value of the desired beam to a variable gain amplifier (VGA) setting of the antenna to generate the desired beam.

In one embodiment, a system for operating a phased array is generally described. The system can include a plurality of beamformer integrated circuits (ICs) connected to a plurality of antennas in a phased array. Each one of the plurality of beamformer ICs is connected to a group of antennas among the plurality of antennas. The system can further include a processor configured to broadcast a plurality of indices to the plurality of beamformer ICs and broadcast a plurality of beam transformation parameters to the plurality of beamformer ICs. Each one of the beamformer ICs can include a beam dictionary, a mapper and a circuit. The beam dictionary can be configured to store beam settings of a plurality of known beams. The mapper can be connected to an antenna among the group of antennas. The circuit can be configured to receive an index among the plurality of indices. The index can identify a location of a beam setting in the beam dictionary and the beam setting identified by the received index includes at least a phase value and a gain value of a known beam. The circuit can be further configured to receive at least one static configuration corresponding to the group of antennas connected to the beamformer IC. The circuit can be further configured to receive at least one beam transformation parameter among the plurality of beam transformation parameters. The circuit can be further configured to transform, based on the at least one beam transformation parameter and the static configuration, the phase value and the gain value of the known beam into a phase value and a gain value of a desired beam. The circuit can be further configured to send the phase value and the gain value of the desired beam to the mapper. The mapper can be configured to map the phase value of the desired beam to a phase shifter setting of the antenna and map the gain value of the desired beam to a variable gain amplifier (VGA) setting of the antenna to generate the desired beam.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 12 illustrates another process relating to arbitrary spatial filters based on beam transformation in one embodiment.

DETAILED DESCRIPTION

Figure 1A:
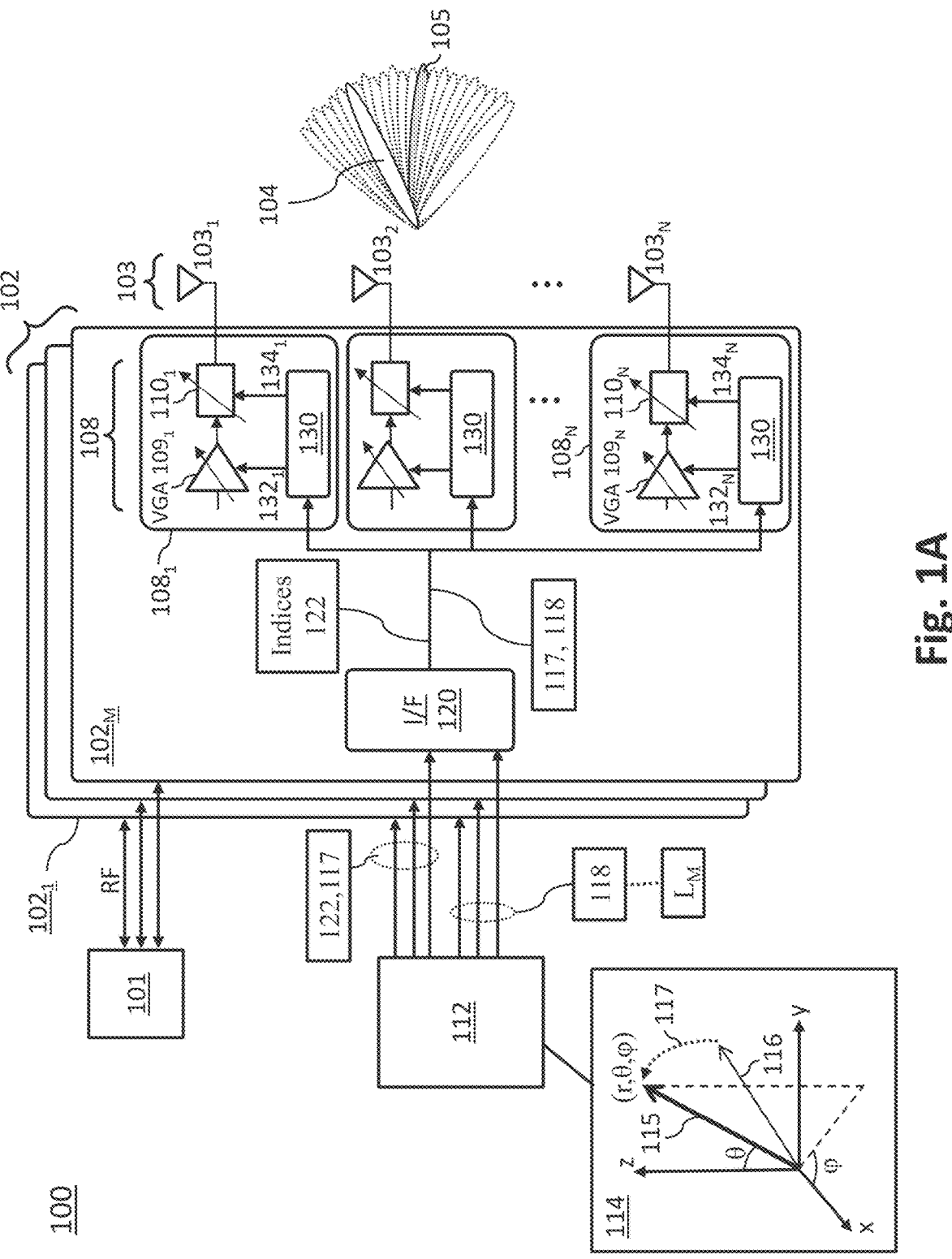
FIG. 1A illustrates an example system that can implement arbitrary spatial filters based on beam transformation in one embodiment.

According to an aspect of the invention, there is provided a method for operating a phased array. The method can include receiving an index associated with an antenna among a plurality of antennas in a phased array. The method can further include using the index to identify at least a phase value and a gain value of a known beam. The method can further include receiving at least one static configuration of the antenna. The method can further include receiving at least one beam transformation parameter. The method can further include transforming, based on the at least one beam transformation parameter and the at least one static configuration, the phase value and the gain value of the known beam into a phase value and a gain value of a desired beam. The method can further include mapping the phase value of the desired beam to a phase shifter setting of the antenna and mapping the gain value of the desired beam to a variable gain amplifier (VGA) setting of the antenna to generate the desired beam.

Advantageously, the method in an aspect can apply beam transformation parameters on known beams to create new beams, such that the number of beams that can be created can increase when compared to other systems that use a finite set of phase and gain combinations. The increased number of beams that can be created can provide more flexibility in various communication systems that use beamforming techniques.

One or more of the following aspects or features can be separable or optional from each other in one or more embodiments.

In another aspect, the at least one static configuration can include a physical location of the antenna with respect to the phased array. The physical location of the antenna can configure phases and gains of individual antennas in the phased array to create new beams.

Yet in another aspect, using the index to identify the phase value and the gain value of the known beam can include identifying the phase value and the gain value of the known beam in a beam dictionary. The indices can identify phases and gains of known beams that are already determined off-chip such that the beamformer ICs can be modified or programmed with minimal amount of changes and also reduce power consumption by the beamformer ICs.

Yet in another aspect, the at least one beam transformation parameter can include at least a steering parameter for steering the known beam to a desired direction. The steering parameter can steer known beams in various steering angles to create new beams. The number of beams that can be created using different steering parameters for individual antennas can be increased when compared to other systems that use a finite set of phase and gain combinations.

Yet in another aspect, the at least one beam transformation parameter can include at least a windowing parameter for reducing sidelobes of the known beam. The windowing parameter can remove sidelobes from known beams to create new beams with different shapes. The number of beams that can be created using different windowing parameters for individual antennas can be increased when compared to other systems that use a finite set of phase and gain combinations.

Yet in another aspect, the at least one beam transformation parameter can include at least a finite impulse response (FIR) filter parameter for filtering specific directions of the known beam. The FIR filter parameter can filter adjacent known beams using different FIR taps to create new beams. The number of beams that can be created using different FIR filter parameters for individual antennas can be increased when compared to other systems that use a finite set of phase and gain combinations.

Yet in another aspect, the at least one beam transformation parameter can include at least a linear combination parameter for combining the known beam with another known beam to form the desired beam. The linear combination parameter can combine different known beams to create new beams. The number of beams that can be created using different linear combination parameters for individual antennas can be increased when compared to other systems that use a finite set of phase and gain combinations.

An integrated circuit that includes a beam dictionary, a mapper and a circuit can be provided. The beam dictionary can be configured to store beam settings of a plurality of known beams. The mapper can be connected to an antenna among a phased array. The circuit can be configured to perform one or more aspects of the methods described herein.

A system that includes a plurality of beamformer integrated circuits (ICs) and a processor can be provided. The processor can be configured to broadcast a plurality of indices and a plurality of beam transformation parameters to the plurality of beamformer ICs. Each one of the beamformer ICs can include a beam dictionary, a mapper and a circuit. The beam dictionary can be configured to store beam settings of a plurality of known beams. The mapper can be connected to an antenna among the group of antennas. The circuit can be configured to perform one or more aspects of the methods described herein.

An example technical use case of the methods, circuits, systems, described herein include radio frequency (RF) transmission systems including RF transmitters, RF receivers, or RF transceivers, wireless communication network, such as, but not limited to, fourth generation (4G) wireless communications system, fifth generation (5G) wireless communications systems, satellite communication system, point-to-point communications systems such as common data link, and/or other types of wireless communication networks, radar and imaging applications.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following descriptions, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

FIG. 1A illustrates an example system that can implement arbitrary spatial filters based on beam transformation in one embodiment. The system 100 can be a radio frequency (RF) transmission system implemented by a communication device, such as a RF transmitter, a RF receiver, or a RF transceiver. The system 100 can be configured to operate at common wireless radio frequencies, millimeter-wave frequencies, and/or microwave frequencies. The system 100 can be a part of a wireless communication network, such as, but not limited to, fourth generation (4G) wireless communications system, fifth generation (5G) wireless communications system, satellite communication system, point-to-point communications systems such as common data link, and/or other types of wireless communication networks. The system 100 can be part of a RF transmitter or RF receiver for the purpose of sensing such as radar, imaging.

The system 100 can include a circuit 101, one or more beamformer integrated circuits (ICs) 102, a plurality of antennas including a group of antennas 103, and a processor 112. The one or more beamformer ICs 102 and the plurality of antennas, including the group of antennas 103, may form a phased array system. The circuit 101 can be a part of a RF communication device such as a radio frequency (RF) transmitter, a RF receiver, a transmission channel of a RF transceiver, or a receiver channel of a RF transceiver. For example, the circuit 101 can include a baseband processor, mixer circuits such as up-down converters, filters, memory devices, local oscillators, digital-to-analog converters (DAC) (if the circuit 101 is a RF transmitter, or a transmission channel of a RF transceiver), analog-to-digital converters (ADC) (if the circuit 101 is a RF receiver, or a receiver channel of a RF transceiver), signal generators, microcontrollers, and/or other types of components or integrated circuits that belong to a RF communication device. The circuit 101 shown in FIG. 1A can be configured to output RF signals to the beamformer ICs 102 when the phased array system is intended to operate as a transmitter. In examples where the circuit 101 is part of a RF transceiver or receiver, the circuit 101 can also be configured to receive RF signals from the beamformer ICs 102. The RF signals being exchanged between the circuit 101 and the beamformer ICs 102 can be radio-frequency, millimeter-wave frequency, or microwave frequency signals that can carry information or data. Processor 112 can be, for example, a part of a microcontroller, central processing unit (CPU), field-programmable gate array (FPGA) or any other circuitry implemented by semiconductor devices that is configured to perform at least some of the operations described herein. By way of example, processor 112 can be configured to perform various operations of system 100 off-chip (e.g., outside of beamformer ICs 102).

Phased array systems, such as system 100, can create spatial filters (e.g., beam specifications that results in beams with specific shape and attributes such as phase, gain, direction, or the like) by applying a signal with different phase and gain at each antenna in an antenna array. An example use case of spatial filters can include receivers, where interference from specific directions are filtered out even when the interference is at the same frequency as the wanted signal and gain in the direction of the wanted signal can be increased. Another use case can include transmitters, where the signal gain can be increased while interference to other users can be reduced by reducing transmissions in unwanted directions. Other use cases can include enabling advanced beam search algorithms to find the direction of the user and can enable advanced sensing by analyzing directional reflections. The beam specifications can cover a relatively large set of parameters, such as beam gain, beam width, beam direction(s), null direction(s), and other parameters.

The plurality of antennas 103 may include N antennas, such as antennas $103_1$ to $103_N$. Each antenna among the antennas 103 may output a RF signal having a respective amplitude and phase. In an example, the system 100 can include M beamformer ICs 102 that may be identical to one another and system 100 can include M groups of antennas, each group of antennas including N antennas, such as antennas 103. Each beamformer IC 102 can be connected to N antennas. Using a beamformer IC $102_M$ as an example, the beamformer IC $102_M$ may include a circuit 120 and a plurality of front-end circuits 108. Each one of the beamformer ICs 102 may include N front-end circuits 108, including front-end circuits $108_1$ to $108_N$. Each front-end circuit 108 may include a respective set of components, such as power amplifiers, variable gain amplifiers (VGA), phase shifters, and/or other types of components or ICs that can implement different beamforming techniques to create spatial filters. By way of example, the front-end circuit $108_1$ may include a VGA $109_1$ and a phase shifter $110_1$, and the front-end circuit $108_N$ may include a VGA $109_N$ and a phase shifter $110_N$. Further, each front-end circuit may be connected to an antenna among antennas 103. A phase shift control setting may be inputted to each phase shifter, among phase shifters $110_1$ to $110_N$, to control the phase of a RF signal being outputted by a connected antenna. A gain control setting may be inputted to each VGA, among VGAs $109_1$ to $109_N$, to control the gain of a RF signal being outputted by a connected antenna. In an aspect, the spatial filter or field pattern or beam pattern for a phased array is based on the gain and phase parameters being set in the front-ends circuits 108 of the M beamformer ICs 102. Thus, the M*N front-ends have 2*M*N unique parameters that define the spatial filter. Thus, in order to truly pick an arbitrary spatial filter among all the spatial filters that can be produced, 2*M*N unique parameters need to be specified. In some embodiments, a relatively large set of possible spatial filters are supported while a relatively small number of parameters can be communicated to the beamforming ICs or the front-ends.

Conventional phased arrays can support a finite set of spatial filters (e.g., approximately 100 to 1000). However, the finite set of spatial filters can limit the number of beam parameters being used for creating different spatial filters. For example, phased array systems that use lookup tables that store beam parameters can provide limited number of phase and gain combinations to create the spatial filters since the lookup tables can be limited by memory and chip size. In another example, phased array systems that use an on-chip calculator to produce linear phase slope beams can only control a single parameter, namely the beam direction and cannot produce other beam shapes. System 100 described herein can be configured to create relatively more different spatial filters by generating relatively more different beam parameters when compared to conventional phased array systems. A circuit 130 can be integrated in each one of beamformer IC 102. Circuit 130 can be a circuit configured to perform beam transformation by transforming one or more known beams using various beam transformation parameters including one or more of beam steering, windowing, filtering, nulling, linear combining, or other types of beam transformations.

In the embodiment shown in FIG. 1A, a copy of circuit 130 can be integrated with each one of front-end circuits 108. A copy of circuit 130 being integrated in a front-end circuit 108 can perform beam transformation to determine phase and gain settings for an antenna connected to the front-end circuit 108. In another embodiment shown in FIG. 1B, a copy of circuit 130 can be integrated in each one of beamformer ICs 102. A copy of circuit 130 being integrated in a beamformer IC 102 can perform multiple beam transformation operations to determine phase and gain settings for the N antennas connected to the beamformer IC 102. Parameters, such as phase and gain, of different known beams can be stored on-chip in beamformer IC 102. Spatial filter of a desired beam can be provided to processor 112, and processor 112 can be configured to decompose the spatial filter of the desired beam into a known beam and beam transformation parameters. The spatial filter provided as input to processor 112 can include one or more parameters, such as peak gain directions, specific gain values for some directions, null directions. Alternatively, the spatial filter provided as input to processor 112 can be a fully specified beam shape including the gain and phase value in each direction.

In the embodiment shown in FIG. 1A, system 100 can generate a desired beam 104. The desired beam 104 can be created by a spatial filter with a given set of specifications, for example the desired peak direction 115, a desired amplitude r, and angular components $\theta$ and $\varphi$. See coordinate system 114 in FIG. 1A, where the antenna array is in the x-y plane and can be centered at the origin of coordinate system 114. In one embodiment, the desired beam 104 can be a broadside beam. To generate the desired beam 104, processor 112 can decompose the spatial filter specifying the desired beam 104. The decomposition performed by processor 112 can result in a known or predefined beam 105 having a set of specifications including a beam direction 116, and a set of beam transformation parameters 117. Application of the beam transformation parameters 117 on the known beam 105 can lead to creation of the desired beam 104. Further, processor 112 can be configured to convert spatial filter of the known beam 105 into a set of indices 122. The set of indices 122 can identify at least one phase value and at least one gain value per antenna in a beam dictionary (described below) implemented in circuit 130. Processor 112 can also extract a set of N static parameters 118 including for example the N locations of the N antennas 103 supported by each beamformer IC 102. The N locations can be represented as a matrix $L_M$ that includes coordinates representing physical locations of each one of the N antennas with respect to the entire phased array of system 100. The static parameters 118 can also be programmed, loaded from memory, or hardcoded.

Processor 112 can broadcast the N static parameters 118, the indices 122 and the beam transformation parameters 117 to the M beamformer ICs 102. Each one of the M beamformer ICs 102 can include a digital interface 120 ("I/F 120" in FIG. 1A and FIG. 1B). Via the digital interface 120, circuit 130 can receive the static parameters 118, the indices 122 and the beam transformation parameters 117. In the embodiment shown in FIG. 1A, each copy of circuit 130 in a front-end circuit 108 can receive an antenna location of an antenna among the locations in the static parameters 118. In the embodiment shown in FIG. 1A, processor 112 can encode addresses of front-end circuits 108 in data representing static parameters 118 and digital interface 120 can route the static parameters to the encoded addresses. By way of example, processor 112 can encode an address of front-end circuit $108_1$ in an antenna location of antenna $103_1$ among locations parameters in the static parameters 118. Digital interface 120 can read the encoded address and route the antenna location antenna $103_1$ to front-end circuit $108_1$.

In the embodiment shown in FIG. 1A, in response to receiving the locations 118, the indices 122 and the beam transformation parameters 117, circuit 130 can identify phase and gain values of known beam 105 based on the indices 122. Circuit 130 can further use a received antenna location among locations 118 and beam transformation parameters 117 to transform the identified phase and gain values into a gain setting, or VGA setting, 132 and a phase shifter setting 134. Circuit 130 can include at least one mapper configured to apply gain setting 132 to a corresponding VGA 109 and to apply phase shifter setting 134 to a corresponding phase shifter 110. The application of the gain setting 132 and phase shifter setting 134 can allow antennas 103 to output signals that form the desired beam 104.

Figure 1B:
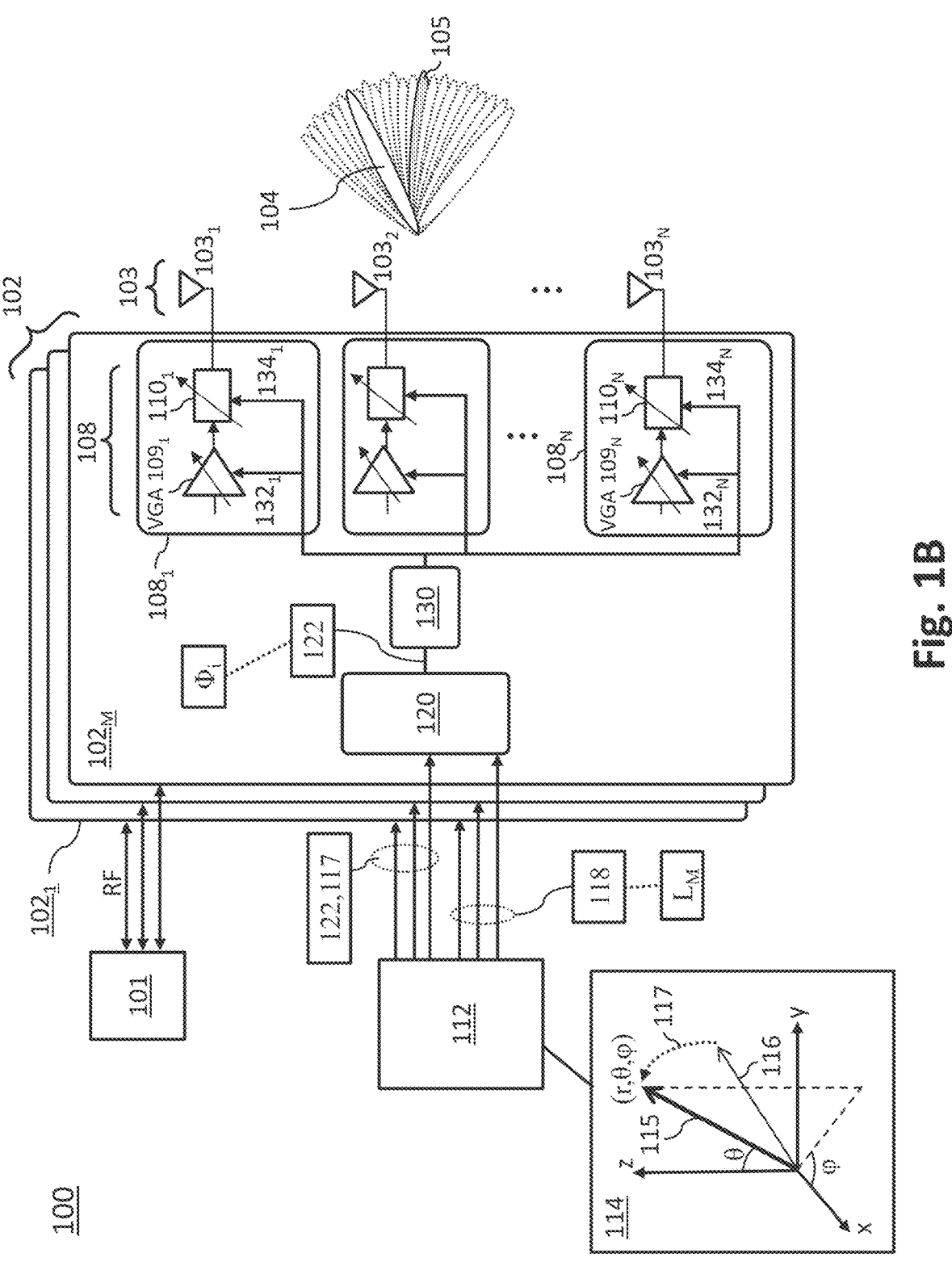
FIG. 1B illustrates another example system that can implement arbitrary spatial filters based on beam transformation in one embodiment.

In the embodiment shown in FIG. 1B, each copy of circuit 130 in a beamformer IC 102 can receive the N static parameters 118, the indices 122 and the beam transformation parameters 117. In the embodiment shown in FIG. 1B, processor 112 can encode addresses of front-end circuits 108 in data representing static parameters 118 and digital interface 120 can provide commands to circuit 130 for using the correct static parameters including antenna location for beam transformation of each antenna among antennas 103. By way of example, processor 112 can encode an address of front-end circuit $108_1$ in an antenna location of antenna $103_1$ among static parameters 118. Digital interface 120 can command circuit 130 to perform beam transformation using the antenna location of antenna $103_1$ for generating gain setting $132_1$ and phase shifter setting $134_1$.

In one embodiment, each copy of circuit 130 in FIG. 1A can receive the same indices 122 and the same beam transformation parameters 117. However, each antenna among the N antennas 103 can output a different signal due to the different antenna locations and the different contents of the beam dictionaries. By way of example, if beam steering is part of beam transformation parameters 117, then the signal outputted by antenna $103_N$ may have a higher phase shift when compared to the signal outputted by antenna $103_2$ since antenna $103_2$ is closer to the center of the array of N antennas 103 when compared to antenna $103_N$.

As a result of applying beam transformation parameters on known beams to create new beams, the number of beams that can be created by system 100 can increase when compared to other systems that use a finite set of phase and gain combinations. Further, the decomposition of the spatial filter of the desired beam 104 is performed off-chip, e.g., outside of beamformer ICs 102, hence beamformer ICs 102 may be modified or programmed with minimal amount of changes, such as using relatively simple components to implement circuit 130 for beam transformation. Also, by offloading the decomposition of spatial filters of known beams to processor 112, beamformer ICs 102 can consume relatively less power.

Figure 2:
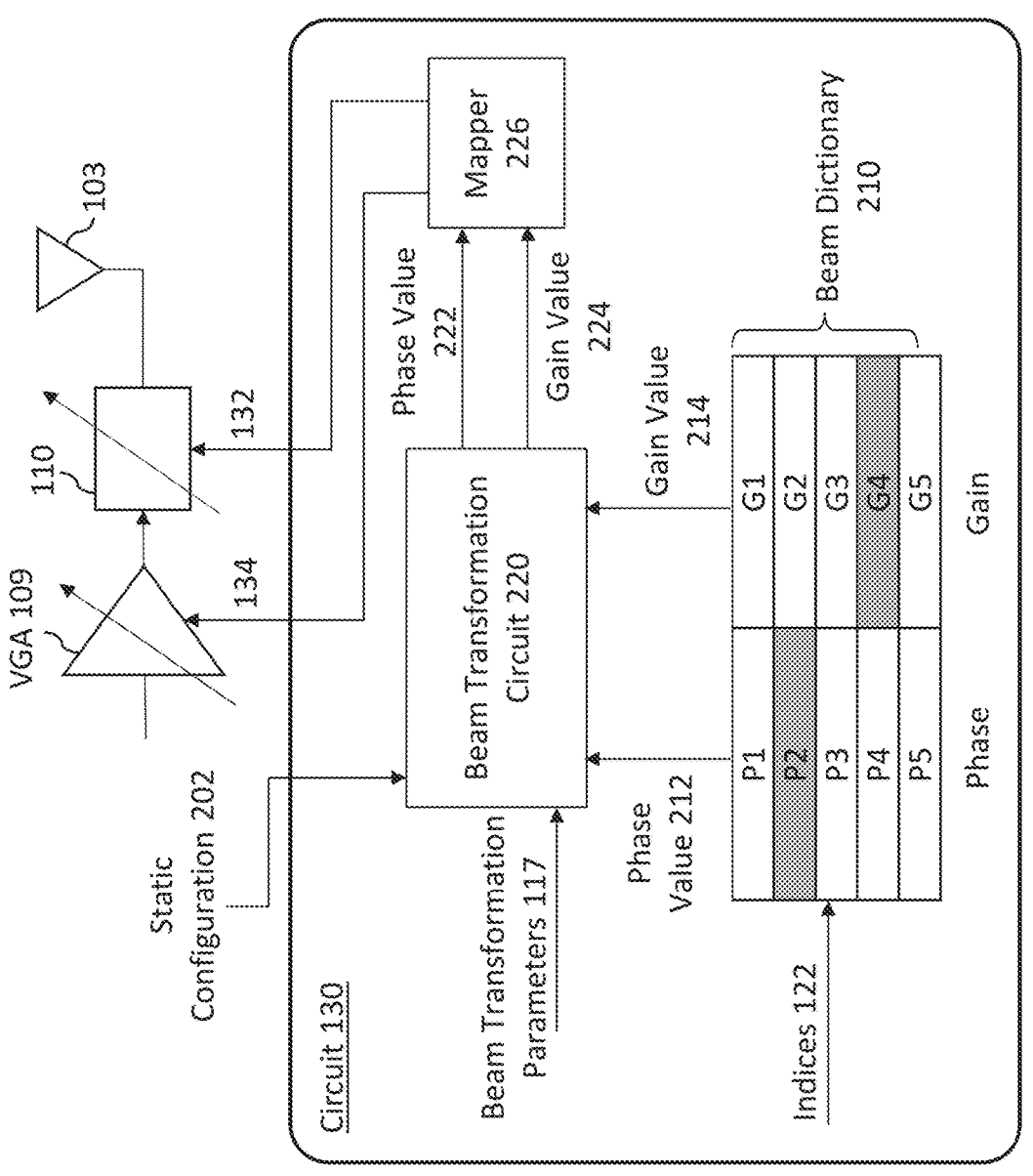
FIG. 2 illustrates an example circuit that can be used for implementing arbitrary spatial filters based on beam transformation in one embodiment.

FIG. 2 illustrates an example circuit that can be used for implementing arbitrary spatial filters based on beam transformation in one embodiment. Descriptions of FIG. 2 may reference components that are shown in FIG. 1A and FIG. 1B. In the embodiment shown in FIG. 2, circuit 130 can include a beam transformation circuit 220, a beam dictionary 210 and a mapper 226. Beam dictionary 210 can be, for example, a lookup table (LUT) implemented by a memory device such as a static random-access memory (SRAM). Beam dictionary 210 can be configured to store a plurality of beam settings or a plurality of known or predefined beams. The plurality of beam settings that can be stored in beam dictionary 210 can include a plurality of phase values and a plurality of gain values of different known beams. In one embodiment, a processor, such as processor 112, can be configured to generate and populate beam dictionary 210 prior to a startup of system 100. In the embodiment shown in FIG. 2, a plurality of phase values P1, P2, P3, P4 and P5 and a plurality of gain values G1, G2, G3, G4 and G5 are stored in beam dictionary 210. Note that additional phase and gain values can be stored in beam dictionary 210 and the amount of phase and gain values that can be stored in beam dictionary 210 can be dependent on a size of the memory device implementing beam dictionary 210, a size of circuit 130, a size of beamformer IC 102, or other factors. Different combinations of phase values and gain values in beam dictionary 210 can be used for forming different known beams. Circuit 130 can receive indices 122 and input indices 122 to beam dictionary 210. Input of indices 122 can trigger an output of at least one phase value and at least a gain value of known beam 105 from beam dictionary 210. In the embodiment shown in FIG. 2, indices 122 can identify a row in a phase column of beam dictionary 210 that stores phase value P2 and can identify a row in a gain column of beam dictionary 210 that stores gain value G4. The identified phase value and gain value can be outputted to beam transformation circuit 220 as phase value 212 and gain value 214, respectively. In one embodiment, the indices for phase and gain settings can be identical. In one embodiment, the beam dictionary 210 can include different phase values and a predefined gain value, such as by having gain value 214 being hardcoded to, for example, a value of 1. In one embodiment, the beam dictionary 210 can include different gain values and a predefined phase value, such as by having the phase value 212 hardcoded to, for example, a value of 0.

Beam transformation circuit 220 can include one or more circuit components for performing various beam transformations on known beams. Beam transformations that can be performed by beam transformation circuit 220 can include, but not limited to, beam steering, beam windowing, FIR filtering, linear combinations of known beams, or other types of beam transformations. Beam transformation circuit 220 can receive beam transformation parameters 117, a static configuration 202, phase value 212 and gain value 214. Static configuration 202 can include static data such as an antenna location of antenna 103 among locations 118, trace length, local oscillator (LO) phase, or others. Beam transformation circuit 220 can use static configuration 202 and beam transformation parameters 117 to transform phase value 212 into another phase value 222, and to transform gain value 214 into another gain value 224. Phase value 222 and gain value 224 can be phase and gain of desired beam 104. Various beam transformations that can be performed by beam transformation circuit 220 will be described in more detail below.

Mapper 226 can include one or more circuits configured to map phase value 222 to phase shifter setting 132 and to map gain value 224 into VGA setting 134. In one embodiment, to perform the mapping, mapper 226 can include circuit components such as digital to analog converters (DAC), decoders, and other circuit components that can convert phase value 222 and gain value 224 into phase shifter setting 132 and gain setting 134. By way of example, phase value 222 can indicate a phase angle of desired beam 104 and mapper 226 can convert the phase angle indicated by phase value 222 into a digital code that sets phase shifter 110 accordingly. Further, mapper 226 may include DACs that can convert the digital codes into analog voltages for controlling phase shifter 110. In another example, gain value 224 can indicate a gain of desired beam 104 and mapper 226 can include DACs that can convert the gain indicated by gain value 224 into an analog voltage that can control the gain of VGA 109. As an example, the mapper 226 may compensate for any non-idealities in the phase shifter 110 and VGA 109. In an example, it may be unnecessary that a VGA and phase shifter be separate circuit components.

Figure 3:
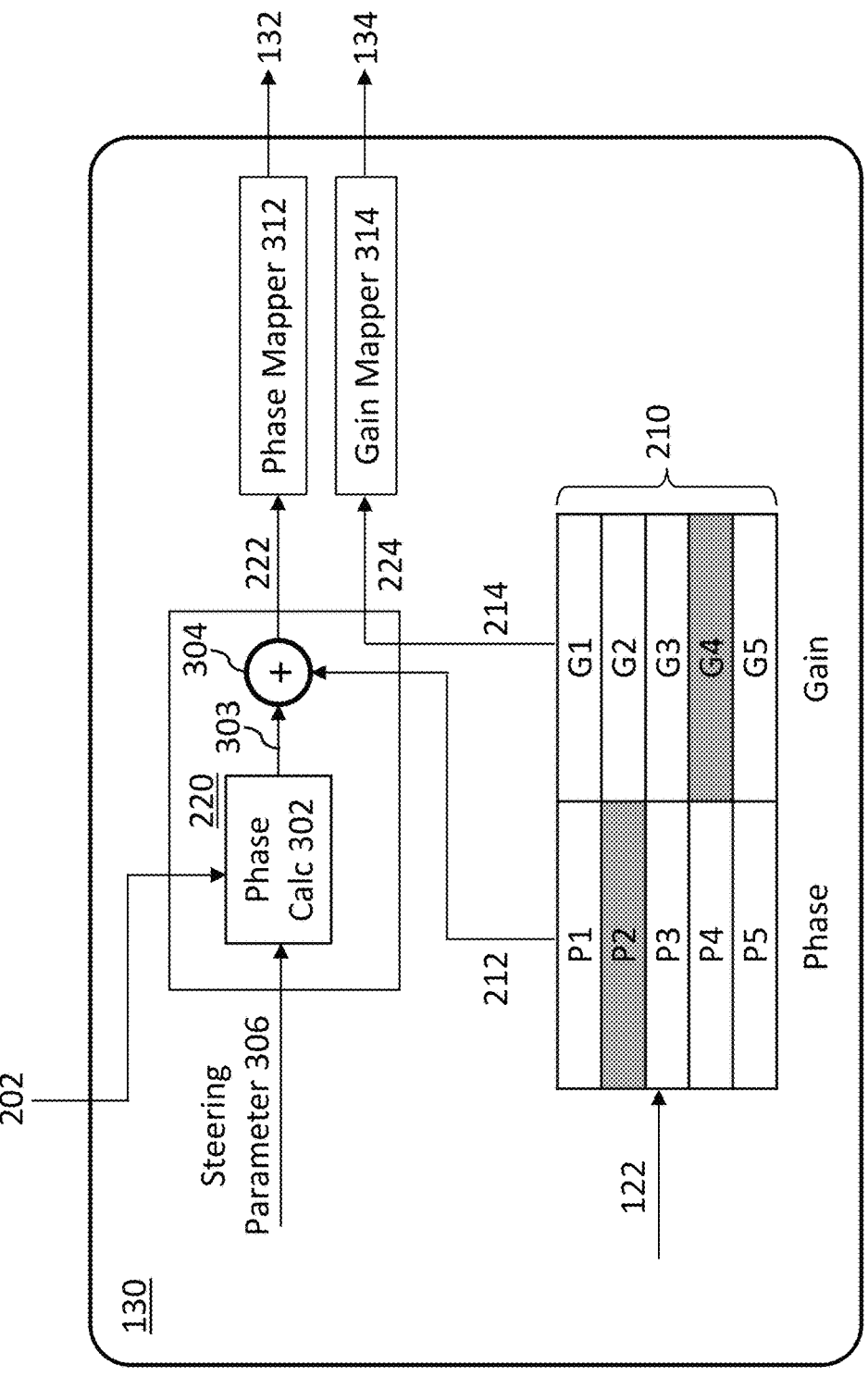
FIG. 3 illustrates an example beam transformation that can be used for implementing arbitrary spatial filters based on beam transformation in one embodiment.

FIG. 3 illustrates an example beam transformation that can be used for implementing arbitrary spatial filters based on beam transformation in one embodiment. Descriptions of FIG. 3 may reference components that are shown in FIG. 1A to FIG. 2. In the embodiment shown in FIG. 3, beam transformation circuit 220 can include a phase determination circuit 302 ("phase calc 302"), a phase adder 304, a phase mapper 312 and a gain mapper 314. Mappers 312, 314 can be parts of mapper 226 shown in FIG. 2. Phase mapper 312 can map phase value 222 to phase shifter setting 132 and gain mapper 314 can map gain value 224 to gain setting 134. In this example, the phase and gain mapping can be independent i.e., phase shifter has no gain variation and VGA has no phase variations. The implementation of circuit 130 in FIG. 3 can perform a three-dimensional (3D) spatial rotation of any arbitrary known beam (e.g., any arbitrary combination of phase and gain), such as known beam 105, stored in beam dictionary 210. The spatial rotation can steer the known beam to a desired direction, and the steered known beam can become the desired beam 104.

Phase determination circuit 302 can receive static configuration 202 that can include an antenna location of an n-th antenna among antennas 103 and a steering parameter 306. For the embodiment shown in FIG. 1A, the n-th antenna can be an antenna that is connected to an n-th front-end circuit 108 that includes circuit 130. For the embodiment shown in FIG. 1B, the n-th antenna can be an antenna that is connected to an n-th front-end circuit 108 that is connected to circuit 130. Steering parameter 306 can be among beam transformation parameters 117. Steering parameter 306 can be used by circuit 130 to perform beam steering on known beam 105 such that known beam 105 is steered to a desired direction. Known beam 105 being steered to the desired direction becomes the desired beam 104.

In one embodiment, steering parameters 306 can indicate a two-dimensional (2D) phase slope that represents a change in the phase of a signal being outputted by an antenna among antennas 103 as a function of the steering angle that leads to the desired direction. Phase determination circuit 302 can be configured to use steering parameter 306 (or the phase slope indicated by steering parameter 306) and the antenna location of the n-th antenna to determine an additional phase shift applied to a signal being outputted by the n-th antenna. The determined additional phase shift can be represented by a phase value 303. Phase adder 304 can combine phase value 303 and phase value 212 from beam dictionary 210 to generate phase value 222. Phase mapper 312 can map phase value 222 to phase shifter setting 132 for phase shifter 110. Note that in the embodiment in FIG. 3, the known beam is being steered without gain changes, thus gain value 214 can be directly provided to gain mapper 314 as gain value 224.

In one embodiment, the antenna location of the n-th antenna can impact the additional phase shift represented by phase value 303. Using coordinate system 114 as reference, the known beam 105 can be rotated by $+\Delta\theta$ in the elevation and a $+\Delta\varphi$ in the azimuthal direction to create the desired beam 104. This spatial rotation requires the addition of a phase with a linear phase slope in the x-y plane. The additional phase shift is given by $i_n \cdot d \sin (\Delta\theta) \cos (\Delta\varphi) + j_n \cdot d \sin (\Delta\theta) \sin (\Delta\varphi)$ where $i_n$, $j_n$ are the coordinates of the antenna in the static configuration 118. The values $d \sin (\Delta\theta) \cos (\Delta\varphi)$ and $d \sin (\Delta\theta) \sin (\Delta\varphi)$ are the phase slope parameters as part of the steering parameters 117, where d is the normalized antenna spacing in the array. If a first antenna is located closer to the center of the array, i.e., the center of the coordinate system, compared to a second antenna, the additional phase shift 303 applied to the first antenna will be smaller in magnitude compared to the phase shift applied to a second antenna. Therefore, despite the same steering parameter 306 being broadcasted to all copies of circuit 130 in system 100, the individual antenna locations can provide a weight for circuit 130 to determine an appropriate amount of steering for different antennas.

By using phase adder 304 to combine phase value 303 and phase value 212, the signal being outputted by the n-th antenna can be phase shifted (e.g., steered) from a phase of known beam 105 to a phase of desired beam 104. Also, if there are J stored beams or spatial filters in beam dictionary 210 and steering parameter 306 indicates a K-bit phase slope, the number of different spatial filters that can be generated by system 100 can be $J \times 2^K$ spatial filters. The K bits of the phase slope is the sum of the bits representing the slope in the x and y direction. The $J \times 2^K$ spatial filters that can be generated by system 100 is more than conventional systems that solely rely on beam dictionary 210 to generate J spatial filters.

Figure 4:
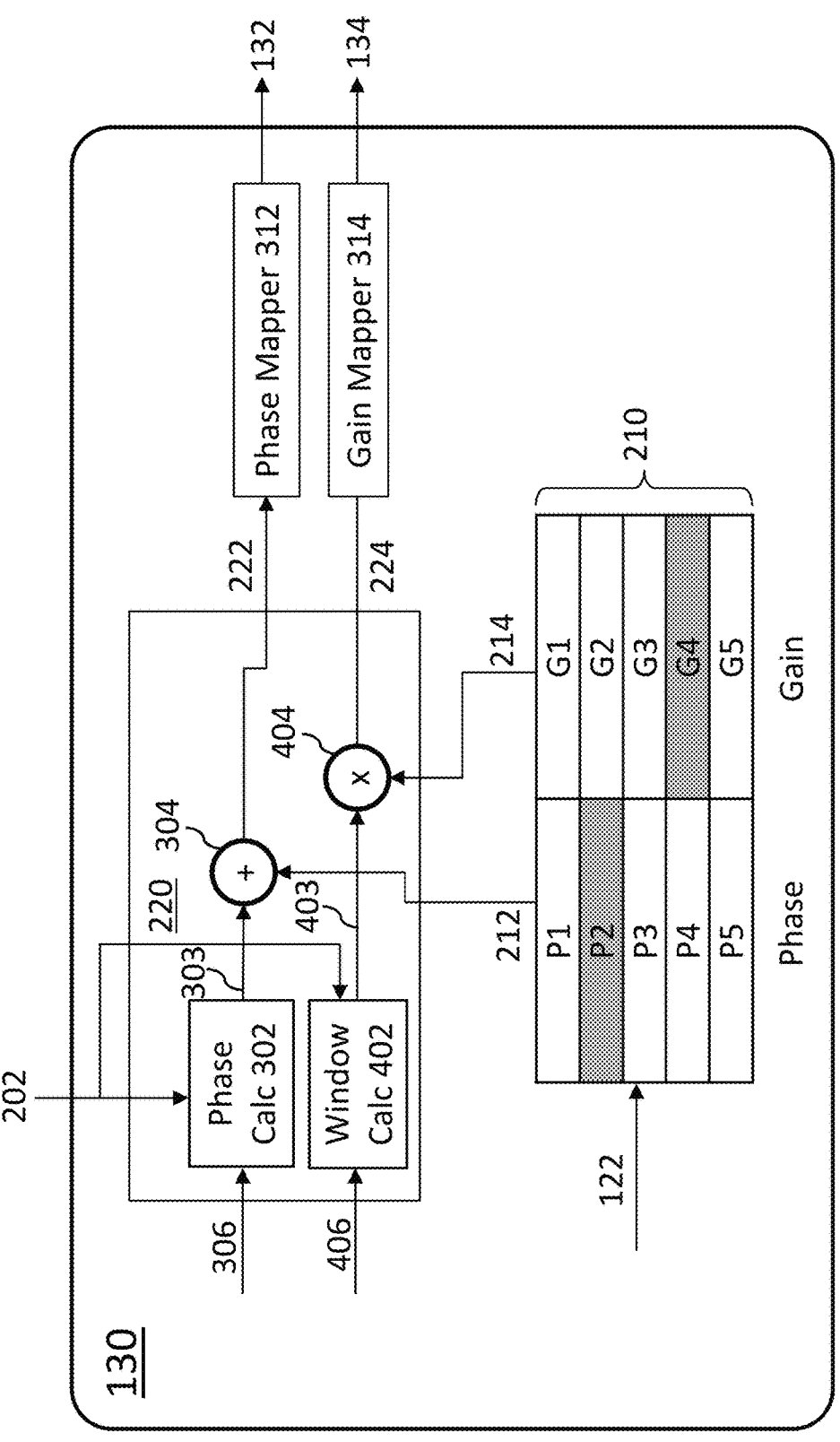
FIG. 4 illustrates another example beam transformation that can be used for implementing arbitrary spatial filters based on beam transformation in one embodiment.

FIG. 4 illustrates another example beam transformation that can be used for implementing arbitrary spatial filters based on beam transformation in one embodiment. Descriptions of FIG. 4 may reference components that are shown in FIG. 1A to FIG. 3. In the embodiment shown in FIG. 4, beam transformation circuit 220 can include phase determination circuit 302, phase adder 304, phase mapper 312, gain mapper 314, a window determination circuit 402 ("window calc 402") and a gain multiplier 404. The implementation of circuit 130 in FIG. 4 can apply window functions to any arbitrary known beam (e.g., any arbitrary combination of phase and gain), such as known beam 105, stored in beam dictionary 210. Application of windowing function to a known beam can reduce sidelobes of the known beam, and the known beam with the reduced sidelobes can become the desired beam 104. The implementation of circuit 130 in FIG. 4 can also perform both steering and windowing such that a known beam can be rotated or steered with reduced sidelobes to form desired beam 104.

Window determination circuit 402 can receive static configuration 202 that can include an antenna location of an n-th antenna among antennas 103 and a windowing parameter 406. Windowing parameter 406 can be among beam transformation parameters 117. Windowing parameter 406 can be used by circuit 130 to perform windowing functions on a gain of known beam 105 (e.g., gain value 214) such that sidelobes of known beam 105 can be reduced. Known beam 105 with the reduced sidelobes can become desired beam 104. In one embodiment, windowing parameter 406 can indicate a sidelobe level of desired beam 104. Window determination circuit 402 can be configured to use the sidelobe level indicated by windowing parameter 406 and the antenna location of the n-th antenna to determine a gain of a signal being outputted by the n-th antenna, where the gain applied to the signal can impact the sidelobes of known beam 105. The determined gain can be represented by a gain value 403. Gain multiplier 404 can combine (e.g., multiply) gain value 403 and gain value 214 from beam dictionary 210 to generate gain value 224. Gain mapper 314 can map gain value 224 to gain setting 134 for VGA 109. By using gain multiplier 404 to combine gain value 403 and gain value 214, the sidelobes of known beam 105 can be reduced based on gain value 224 and the known beam 105 with reduced sidelobes can be steered based on phase value 303 to create desired beam 104. In an alternate example, the gains may be represented in a decibel scale in which case 404 may be implemented as an adder.

In one embodiment, the antenna location of the n-th antenna can impact the sidelobe reduction based on gain value 224. If a first signal from a first antenna contributes to the presence of sidelobes in known beam 105 more than a second signal from a second antenna, then the gain value 403 determined for the first antenna can reduce a gain or amplitude of the first signal by a greater factor when compared to the gain value 403 determined for the second antenna. Therefore, despite the same windowing parameter 406 being broadcasted to all copies of circuit 130 in system 100, the individual antenna locations can provide a weight for circuit 130 to provide an appropriate amount of sidelobe reduction for different antennas.

In one embodiment, windowing determination circuit 402 can output on or off gain coefficients as gain value 403. An on gain coefficient can maintain a gain or amplitude of the signal being outputted by the n-th antenna. An off gain coefficient can decrease a gain or amplitude of the signal being outputted by the n-th antenna. The determination of outputting an on or off gain coefficient can be dependent on the antenna location of the n-th antenna in static configuration 202. In such an example, the windowing results in selection of a subset of the antennas in the antenna array being used by the array.

Figure 5:
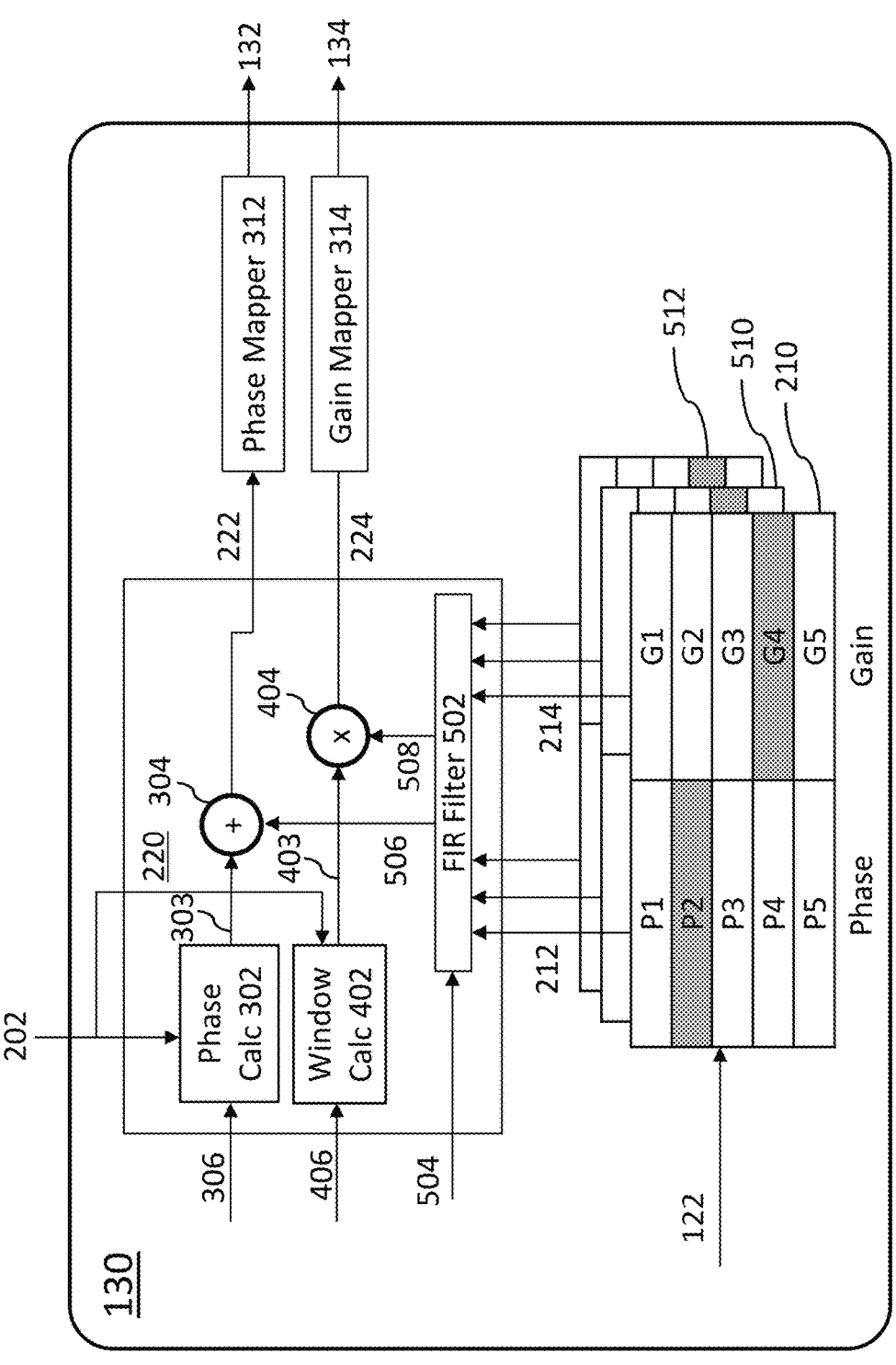
FIG. 5 illustrates another example beam transformation that can be used for implementing arbitrary spatial filters based on beam transformation in one embodiment.

FIG. 5 illustrates another example beam transformation that can be used for implementing arbitrary spatial filters based on beam transformation in one embodiment. Descriptions of FIG. 5 may reference components that are shown in FIG. 1A to FIG. 4. In the embodiment shown in FIG. 5, beam transformation circuit 220 can include phase determination circuit 302, phase adder 304, phase mapper 312, gain mapper 314, window determination circuit 402, gain multiplier 404, and a FIR filter 502. The implementation of circuit 130 in FIG. 5 can apply FIR filtering on any arbitrary known beam (e.g., any arbitrary combination of phase and gain), such as known beam 105, stored in beam dictionary 210. As an example, application of the FIR filter can null specific directions of the known beam, and the known beam with the null directions specified by the FIR filtering 502 becomes the desired beam 104. The implementation of circuit 130 in FIG. 5 can also perform steering, windowing and FIR filtering such that a known beam can be filtered to null specific directions, and then steered, rotated and windowed to form desired beam 104.

FIR filter 502 can receive a set of FIR coefficients 504 (or FIR filter taps) that can be a set of weight values. FIR filter 502 can also receive phase value 212 and gain value 214 from beam dictionary 210, and also phase and gain values from one or more adjacent beam dictionaries. An adjacent beam dictionary can be a beam dictionary being used for an antenna adjacent to the n-th antenna. By way of example, a beam dictionary 510 can be a beam dictionary for antenna n+1 and a beam dictionary 512 can be a beam dictionary for antenna n−1. All beam dictionaries may use the same indices 122. FIR filter 502 can perform a linear combination by multiplying the FIR taps with corresponding phase value and gain value among the phase values and gain values received by FIR filter 502. The linear combination between the FIR taps and the phase values can be outputted as phase value 506 and gain value 508. Phase adder 304 can add phase value 303 from phase determination circuit 302 to phase value 506 to generate phase value 222. Gain multiplier 404 can multiply gain value 403 from window determination circuit 402 with gain value 508 to generate gain value 224. The sum of phase values 303, 506 and the product of gain values 403, 508 perform a filtering of the known beam 105, for example it can null specific directions of known beam 105. In one embodiment, the specific directions being nulled can be based on the weights or values of the FIR coefficients 504.

Figure 6:
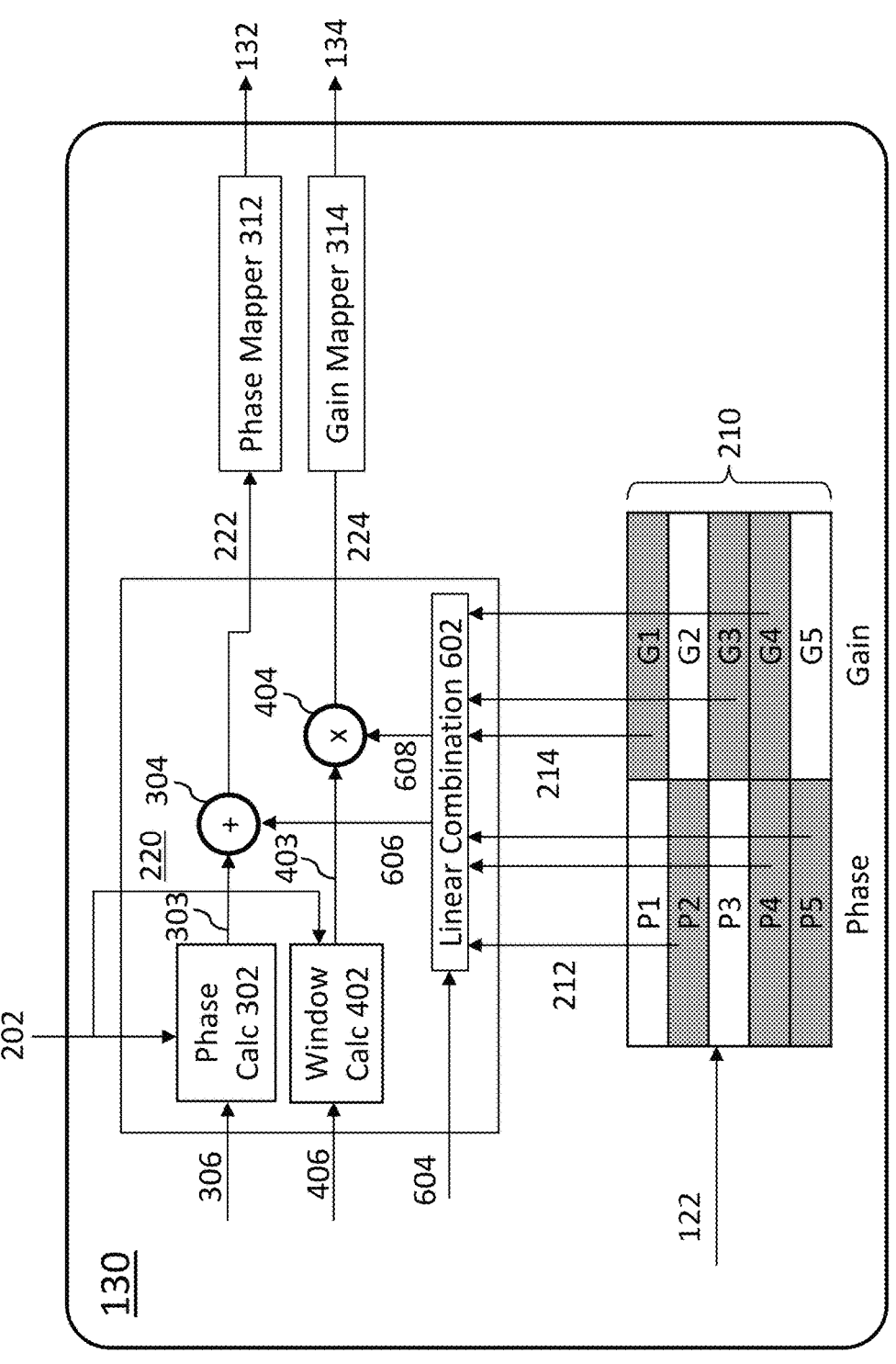
FIG. 6 illustrates another example beam transformation that can be used for implementing arbitrary spatial filters based on beam transformation in one embodiment.

FIG. 6 illustrates another example beam transformation that can be used for implementing arbitrary spatial filters based on beam transformation in one embodiment. Descriptions of FIG. 6 may reference components that are shown in FIG. 1A to FIG. 5. In the embodiment shown in FIG. 6, beam transformation circuit 220 can include phase determination circuit 302, phase adder 304, phase mapper 312, gain mapper 314, window determination circuit 402, gain multiplier 404, and a linear combination circuit 602. The implementation of circuit 130 in FIG. 6 can apply linear combination on more than one known beams, or more than one combination of phase and gain values, stored in beam dictionary 210. Application of the linear combination circuit 602 can combine more than one known beams to generate beams of specific shapes, such as multi-armed beams, nulled beams for example. The implementation of circuit 130 in FIG. 6 can also perform steering, windowing and linear combination such that a known beam can be combined with different known beams and then rotated, steered, windowed to form desired beam 104.

Linear combination circuit 602 can receive a set of linear combination coefficients 604 that can be a set of weight values. Linear combination circuit 602 can also receive more than one phase value and more than one gain value from beam dictionary 210. In an example shown in FIG. 6, linear combination circuit 602 can receive phase values P2, P4, P5 and gain values G1, G3, G4 from beam dictionary 210. By way of example, phase P2 and gain G4 can be phase and gain values for known beam 105, phase P4 and gain G1 can be phase and gain of a first other known beam, and phase P5 and gain G3 can be phase and gain of a second other known beam. Linear combination circuit 602 can perform a linear combination by multiplying the set of linear combination coefficients 604 with corresponding phase value and gain value from beam dictionary 210. The linear combination between the linear combination coefficient 604 and the more than one phase value(s) 212 and gain value(s) 214 can be outputted as phase value 606 and gain value 608. Phase adder 304 can add phase value 303 from phase determination circuit 302 to phase value 606 to generate phase value 222. Gain multiplier 404 can multiply gain value 403 from window determination circuit 402 with gain value 608 to generate gain value 224. The sum of phase values 303, 606 and the product of gain values 403, 608 can combine the phases and gains of more than one known beams. In one embodiment, combination of different beams having different phase values and gains can create desired beam 104 as a multi-armed beam that emits RF signals in more than one direction. The multi-armed beam can be steered with reduced sidelobes based on phase value 303 and gain value 403. As another example, combination of different beams can also be used to null specific directions. The nulled beam can also be steered with reduced sidelobes based on phase value 303 and gain value 403.

Figure 7:
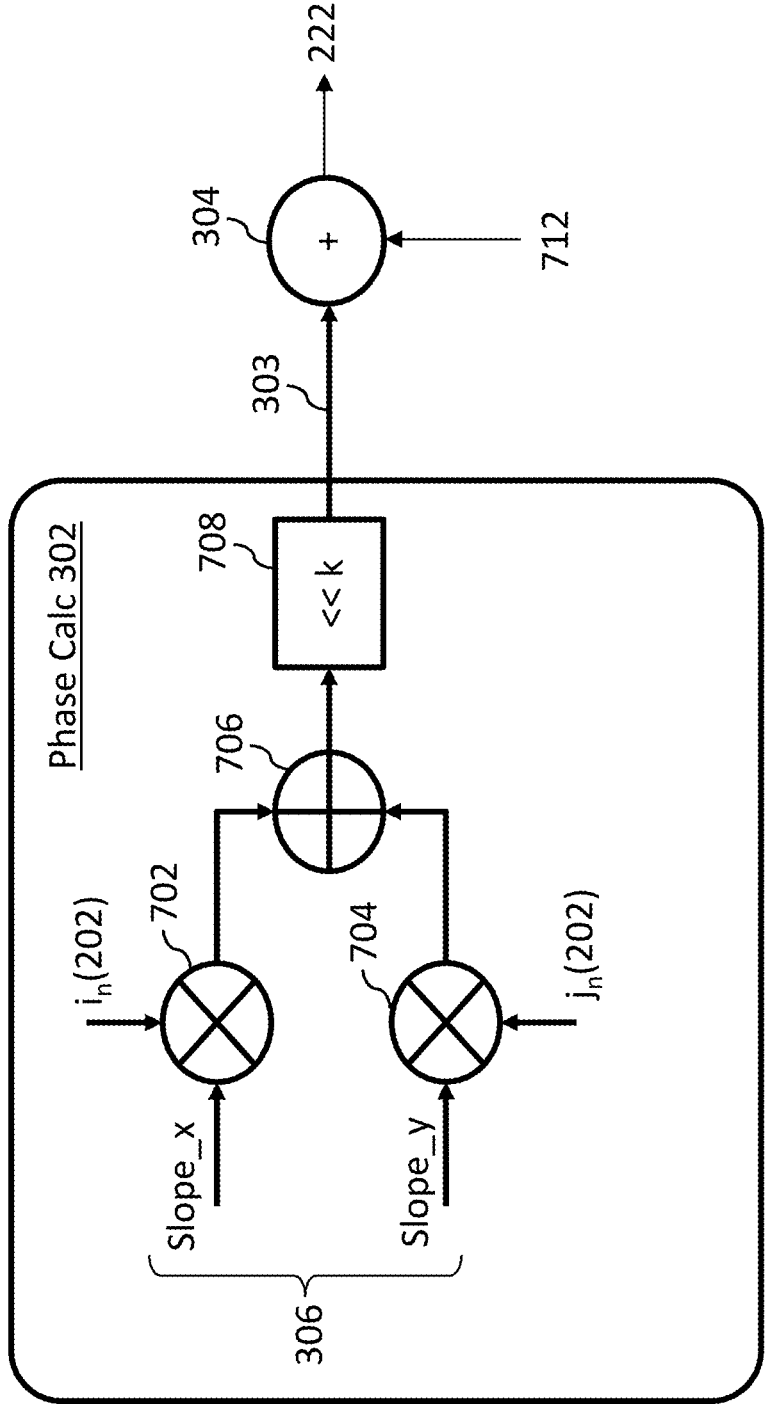
FIG. 7 illustrates an example of a phase determination circuit that can be used for implementing arbitrary spatial filters based on beam transformation in one embodiment.

FIG. 7 illustrates an example of a phase determination circuit that can be used for implementing arbitrary spatial filters based on beam transformation in one embodiment. Descriptions of FIG. 7 can reference components that are shown in FIG. 1A to FIG. 6. In the example shown in FIG. 7, phase determination circuit 302 can include a multiplier 702, a multiplier 704, an adder 706 and a bit shifter 708. Multiplier 702 can receive a parameter Slope_x and a parameter $i_n$ and multiplier 704 can receive a parameter Slope_y and a parameter $j_n$. Slope_x and Slope_y are the phase slopes that implement a steering required to produce desired beam 104 and can be indicated by steering parameter 306. Parameters $i_n$ and $j_n$ can be among static configuration 202 and can be individual coordinates of an antenna location $(i_n, j_n)$ for an n-th antenna. Referring to coordinate system 114 in FIG. 1A and FIG. 1B, the antenna location $(i_n, j_n)$ can lie in the x-y plane such that $i_n$ is an x-component and $j_n$ is a y-component. The coordinates are normalized by the antenna spacing parameters d. As an example, for a spatial rotation by $(\Delta\theta, \Delta\varphi)$ in the elevation and azimuth directions, the slope parameters that are part of beam transformation parameters 117 may be $slope_x = d \sin(\Delta\theta) \cos(\Delta\varphi)$ and $slope_y = d \sin(\Delta\theta) \sin(\Delta\varphi)$. Multiplier 702 can multiply Slope_x with $i_n$ and multiplier 704 can multiply Slope_y with $j_n$. Adder 706 can add the products being outputted by multipliers 702, 704 to generate a sum. The sum produced by adder 706 can be provided to shifter 708, where shifter 708 can perform left shift operation to multiply the sum by $2^k$, where k is a predefined parameter. In certain fixed point representations, it may be required to renormalize the computed phase shifts using a bit-shift operation using bit-shifter 708. The output of shifter 708 can be the phase value 303. Phase adder 304 can add phase value 303 to phase value 712 to generate phase value 222, where phase value 712 can be computed from one or more of phase value 212 from beam dictionary 210, outputs from FIR filter 502 and outputs from linear combination circuit 602.

Figure 8:
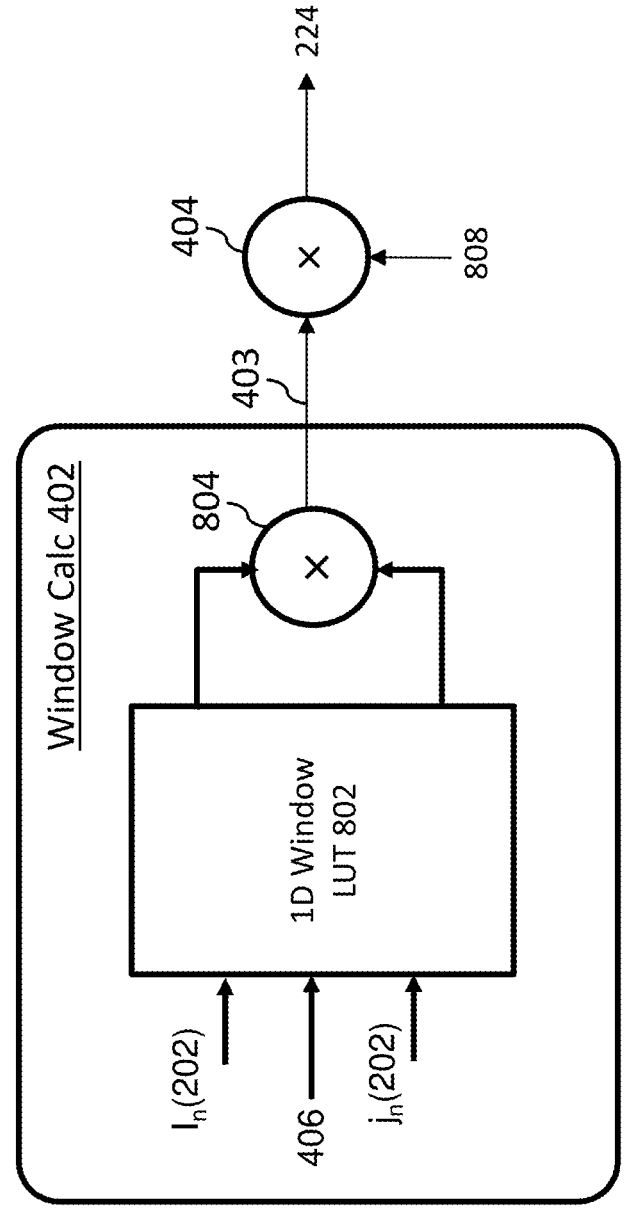
FIG. 8 illustrates an example of a window determination circuit that can be used for implementing arbitrary spatial filters based on beam transformation in one embodiment.

FIG. 8 illustrates an example of a window determination circuit that can be used for implementing arbitrary spatial filters based on beam transformation in one embodiment. Descriptions of FIG. 8 can reference components that are shown in FIG. 1A to FIG. 7. In the example shown in FIG. 8, window determination circuit 402 can include a one-dimensional (1D) window lookup table (LUT) 802 and a multiplier 804. The 1D window LUT 802 can receive static configuration 202 that includes $i_n$ and $j_n$ and beam transformation parameters that include window configuration parameter 406. For example, 406 may specify the desired sidelobe level and the desired windowing function such as Taylor windowing. The 1D window LUT 802 can store mappings among $i_n$ $j_n$ and different gain values for various windowing functions with various parameters. The 1D window LUT 802 can output a first gain that maps to $i_n$ and output a second gain that maps to $j_n$. Multiplier 804 can multiply the first gain with the second gain to generate gain value 403. Gain multiplier adder 404 can multiply gain value 403 with gain value 808 to generate gain value 224, where gain value 808 can be computed from one or more of gain value 214 from beam dictionary 210, outputs from FIR filter 502 and outputs from linear combination circuit 602. This example assumes composable windowing functions where 1D lookup tables are sufficient. In some examples, Window calculator 402 may be a 2D window LUT that outputs a gain value 403 using a 2D input $i_n$, $j_n$, and the parameter 406.

Figure 9:
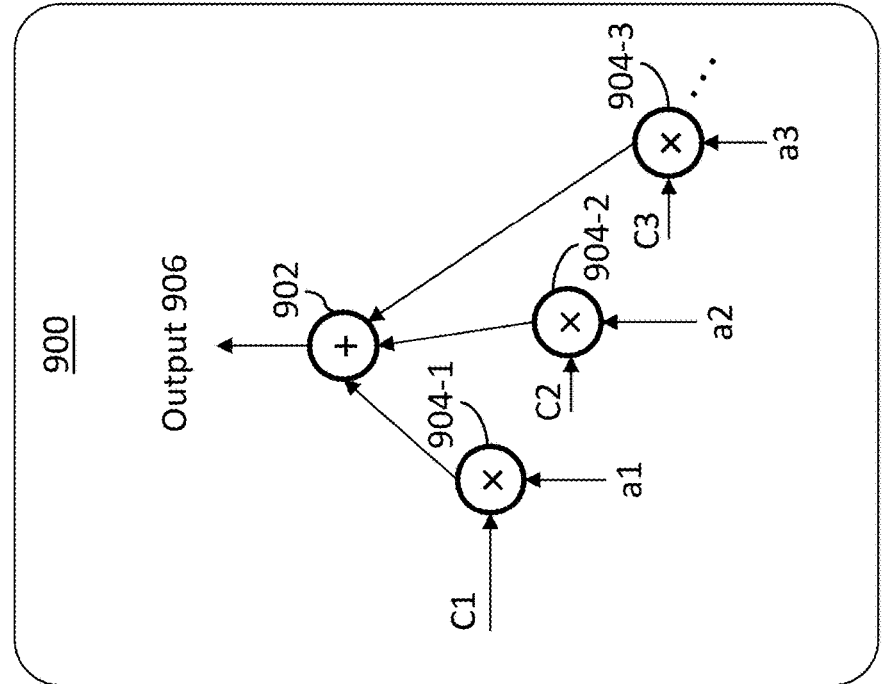
FIG. 9 illustrates an example of a circuit for finite impulse response (FIR) filtering and linear combination that can be used for implementing arbitrary spatial filters based on beam transformation in one embodiment.

FIG. 9 illustrates an example of a circuit for finite impulse response (FIR) filtering and linear combination that can be used for implementing arbitrary spatial filters based on beam transformation in one embodiment. Descriptions of FIG. 9 can reference components that are shown in FIG. 1A to FIG. 8. In the example shown in FIG. 9, a circuit 900 can implement FIR filter 502 in FIG. 5 or linear combination circuit 602 in FIG. 6. Circuit 900 can include an adder 902 and a plurality of multipliers 904-1, 904-2, 904-3. The number of multipliers in circuit 900 can be arbitrary and can be dependent on a desired implementation of circuit 900. In the example shown in FIG. 9, circuit 900 can receive coefficients C1, C2, C3 and parameters a1, a2, a3. Parameters a1, a2, a3 can be complex values including phase values and gain values. If circuit 900 is implementing FIR filter 502, then coefficients C1, C2, C3 are among FIR coefficients 504 shown in FIG. 5 and parameters a1, a2, a3 can be complex values including phase values and gain values from beam dictionaries of different antennas that may be adjacent to one another as shown in FIG. 5. If circuit 900 is implementing linear combination circuit 602, then coefficients C1, C2, C3 are among linear combination coefficients 604 shown in FIG. 6 and parameters a1, a2, a3 can be complex values including different phase value 212 and gain value 214 from beam table 210 shown in FIG. 6.

Each multiplier among the multipliers of circuit 900 can multiple a coefficient with a corresponding parameter. For example, multiplier 904-1 can multiply C1 with a1, multiplier 904-2 can multiply C2 with a2, and multiplier 904-3 can multiply C3 with a3. Adder 902 can add the products outputted from multipliers 904-1, 904-2, 904-3 to generate an output 906. If circuit 900 is implementing FIR filter 502, then output 906 can be the complex value consisting of phase value 506 and gain value 508 shown in FIG. 5. If circuit 900 is implementing linear combination circuit 602, then output 906 can be the complex value including phase value 606 and gain value 608 shown in FIG. 6. By way of example, output 906 can be a linear combination $a_1c_1 + a_2c_2 + a_3c_3$.

Figure 10:
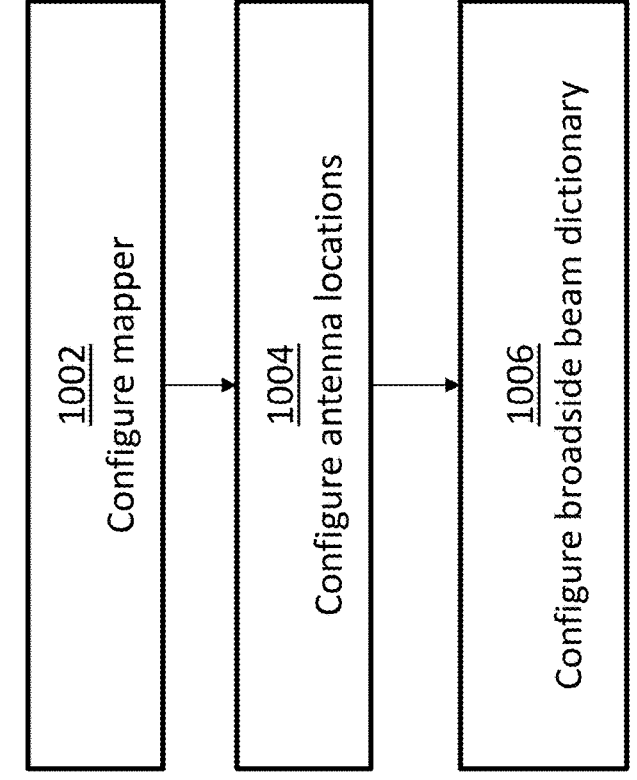
FIG. 10 illustrates a process relating to arbitrary spatial filters based on beam transformation in one embodiment.

FIG. 10 illustrates a process relating to arbitrary spatial filters based on beam transformation in one embodiment. Description of FIG. 10 can reference components that are shown in FIG. 1A to FIG. 9. The process 1000 in FIG. 10 may be implemented using, for example, system 100 discussed above. Process 1000 may include one or more operations, actions, or functions as illustrated by one or more of blocks 1002, 1004 and/or 1006. Although illustrated as discrete blocks, various blocks may be divided into additional blocks, combined into fewer blocks, eliminated, performed in different order, or performed in parallel, depending on the desired implementation.

Process 1000 can be a process to initialize system 100. Process 1000 can begin at block 1002. At block 1002, a processor (e.g., processor 112) can configure one or more mappers (e.g., mappers 226, 312, 314) in one or more copies of a beam transformation circuit (e.g., circuit 130). The processor can configure the one or more mappers by defining mappings between phase values and phase shifter settings, and mappings between gain values and VGA settings. In some examples, the processor can configure the one or more mappers by defining mappings between phase and gain values and the required phase shifter and VGA settings. Upon the configuration, the one or more mappers can receive given phase and gain values and output phase shifter settings and VGA settings that are mapped to the given phase and gain values.

Process 1000 can proceed from block 1002 to block 1004. At block 1004, the processor can configure static configurations, such as a plurality of antenna locations in the two dimensions of the phased array (e.g., x-y plane in coordinate system 114). The configuration of the plurality of antenna locations can include mapping identifiers of front-end circuits (e.g., front-end circuits 108) with locations of antennas in the phased array. The processor can also configure other static configurations such as window calculator LUTs, specific phase calibrations including trace length, local oscillator (LO) phase, or others.

Process 1000 can proceed from block 1004 to block 1006. At block 1006, the processor can configure a spatial filter dictionary, or a beam dictionary, with phase and gain values of known beams (e.g., known or predefined broadside beam shapes). Configuration of the beam dictionary can include storing phase and gain values of known beams in a memory device implementing the beam dictionary. In one embodiment, one memory device can be used for implementing the beam dictionary. In another embodiment, more than one memory devices can be used for implementing the beam dictionary, such as by storing phase values in a first memory device and the gain values in a second memory device. Note that using one memory device can preserve circuit board area and using more than one memory device can store independent phase and gain values thus generating more beams with different shapes.

Figure 11:
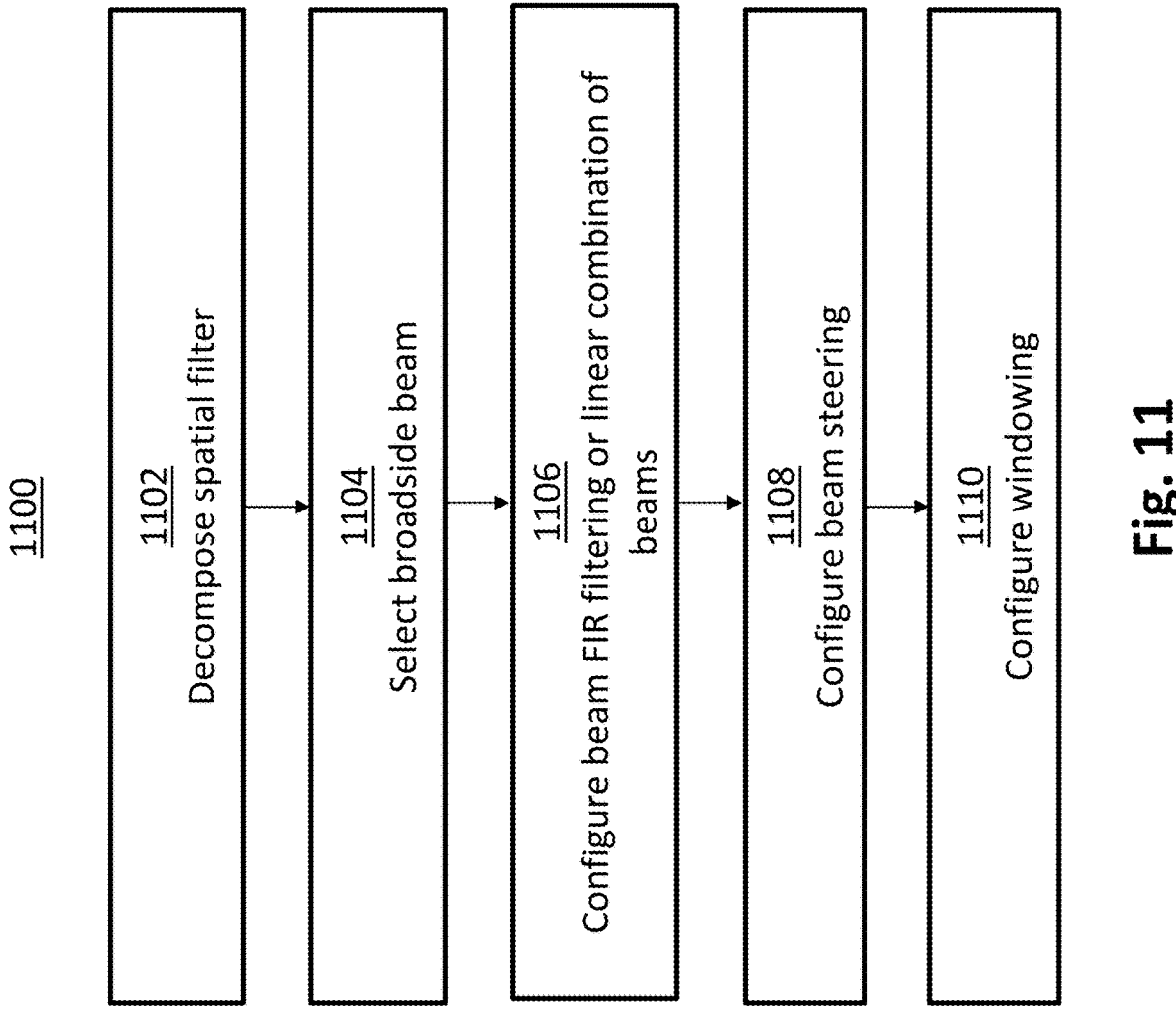
FIG. 11 illustrates another process relating to arbitrary spatial filters based on beam transformation in one embodiment.

FIG. 11 illustrates another process relating to arbitrary spatial filters based on beam transformation in one embodiment. Description of FIG. 11 can reference components that are shown in FIG. 1A to FIG. 10. The process 1100 in FIG. 11 may be implemented using, for example, system 100 discussed above. Process 1100 may include one or more operations, actions, or functions as illustrated by one or more of blocks 1102, 1104, 1106, 1108 and/or 1110. Although illustrated as discrete blocks, various blocks may be divided into additional blocks, combined into fewer blocks, eliminated, performed in different order, or performed in parallel, depending on the desired implementation.

Process 1100 can be a process to create desired beams (broadside beams) by switching arbitrary known beams. Process 1100 can begin at block 1102. At block 1102, a processor (e.g., processor 112) can receive desired beam features or desired spatial filter such as phase and gain of a desired beam (e.g., desired beam 104). Also at block 1102, the processor can decompose the desired spatial filter into one or more parameters, such as broadside filter (e.g., a known spatial filter or beam), steering angle, window, FIR filtering coefficients or taps, linear combination coefficients, or other parameters of the desired spatial filter. In one embodiment, the received desired spatial filter can also include features such as main lobe directions, gains, beam widths and null directions and the processor can perform beam shape transformation and decomposition of the features.

Process 1100 can proceed from block 1102 to block 1104. At block 1104, the processor can select one or more known beam(s). Upon the selection, the processor can broadcast one or more indices identifying phase and gain values of the selected known beam(s) to the beam dictionary in the beam transformation circuit. In one embodiment, if the phase and gain values of the selected known beam(s) are not stored in the beam dictionary, then the processor can add the phase and gain values of the selected known beam into the beam dictionary.

Process 1100 can proceed from block 1104 to block 1106. At block 1106, if the received desired spatial filter includes FIR filtering taps, the processor can broadcast the FIR filtering taps to all copies of the beam transformation circuit (e.g., circuit 130). The beam transformation circuits can perform individual FIR filtering based on antenna locations as described above. If the received desired spatial filter includes linear combination coefficients, the processor can broadcast the linear combination coefficients to all copies of the beam transformation circuit (e.g., circuit 130). The beam transformation circuits can perform individual linear combinations to combine more than one known beams as described above.

Process 1100 can proceed from block 1106 to block 1108. At block 1108, if the received desired spatial filter includes steering parameters, the processor can broadcast the steering parameters to all copies of the beam transformation circuit. The beam transformation circuits can perform phase determination to determine an additional phase shift for respective signals being outputted by different antennas for beam steering as described above.

Process 1100 can proceed from block 1108 to block 1110. At block 1110, if the received desired spatial filter includes windowing parameters, the processor can broadcast the windowing parameters to all copies of the beam transformation circuit. The beam transformation circuits can perform window determination to adjust gain of respective signals being outputted by different antennas for sidelobe reduction as described above. Note that blocks 1108 and 1110 can be performed in any arbitrary order or can be performed in parallel.

In one embodiment, to decompose the desired spatial filter, the processor can perform a first technique that starts with determining all possible transformations of the known beams in the beam dictionary that can be generated by the beam transformers on-chip (e.g., steering, windowing, FIR filtering, linear combinations). A transformation of a known beam can lead to a creation of a new beam. For example, the processor can apply H different transformations on 50 known beams to determine 50H different new beams that can be created. When the processor receives the desired spatial filter (e.g., by user input) having given specifications (e.g., peak gain, direction of peak gain, beam width, nulls location, null depths, sidelobe levels, multi-beam requirements), the processor can perform a search by comparing the given specifications with all the possible new beams that were determined. A result of the comparison can identify a known beam in the beam dictionary that may be closest to the desired spatial filter. By way of example, the received desired spatial filter can indicate a gain of >30 decibels (dB) at 20 degrees and null at −24 degrees. The processor can compare this received desired spatial filter with all the possible new beams to identify a specific new beam that has a gain greater than and closest to 30 dB, a phase closest to 20 degrees and a null direction closest to −24 degrees. The processor can further identify a specific known beam(s) and the transformation that was used on the specific known beam(s) that resulted in the specific new beam. The processor can determine the indices 122 to identify the identified specific known beam in the beam table, and can convert the parameters in the identified transformation into beam transformation parameters 117.

In another embodiment, to decompose the desired spatial filter, the processor can perform a second technique that optimizes the known beam(s) and beam transformation parameters such that the produced beam 104 best matches the specifications of the desired spatial filter. As a first step, the desired spatial filter is transformed using beam steering to a canonical representation. By way of example, a beam may be transformed to a representation where the strongest beam direction is in the broadside direction along with a corresponding beam steering parameter. For example, if the desired spatial filter has a peak at 20 degrees and a null at −24 degrees, it can be transformed to a spatial filter with a peak at 0 degrees and a null at −44 degrees, i.e., a canonical representation. With the given canonical beam, a beam steering of +20 degrees produces the desired spatial filter. Thus, in response to receiving the desired spatial filter, the processor may calculate/simulate the spatial rotation/beam steering parameters (for example steering parameter 306) among the transformation parameters 117 along with the canonical representative beam in the broadside. In response to determining the canonical representative beam, the processor can determine whether the representative beam, or a combination of phase and gain values of the representative beam, is stored in the beam dictionary. If the representative beam is already stored in the beam dictionary, then the processor can provide the representative beam and the determined transformation parameters.

In one embodiment, if the representative beam is not stored in the beam dictionary, then the processor can identify a known beam in the beam dictionary that may have the closest phase and gain values to the representative beam. In another embodiment, if the representative beam is not stored in the beam dictionary and if the desired spatial filter includes null directions, then the processor can determine a FIR filter (e.g., determine FIR taps) that produces the desired null directions and apply the determined FIR filter to all beams in the beam dictionary. The processor can identify a known beam that best matches the canonical representation of the desired spatial filter after application of the determined FIR filter. The processor thus identifies the beam indices 122 and the beam transformation parameters 117 including the FIR filter coefficients 504 along with the previously determined steering parameters 306. In another embodiment, the processor can identify a known beam with energy in desired directions (e.g., peaks and nulls) and perform linear combinations that can produce a beam closest to the canonical representative beam. In this example, the processor identifies the beam indices 122 for the known beams and the beam transformation parameters 117 including the linear combination coefficients 604 along with previously determined steering parameters 306.

FIG. 12 illustrates another process relating to arbitrary spatial filters based on beam transformation in one embodiment. The process 1200 in FIG. 12 may be implemented using, for example, system 100 discussed above. An example process may include one or more operations, actions, or functions as illustrated by one or more of blocks 1202, 1204, 1206, 1208, 1210 and/or 1212. Although illustrated as discrete blocks, various blocks may be divided into additional blocks, combined into fewer blocks, eliminated, performed in different order, or performed in parallel, depending on the desired implementation.

Process 1200 can be performed by, for example, a beamformer IC, such as beamformer ICs 102 described herein. Process 1200 can begin at block 1202. At block 1202, the beamformer IC can receive an index associated with an antenna among a plurality of antennas in a phased array. Process 1200 can proceed from block 1202 to block 1204. At block 1204, the beamformer IC can use the index to identify at least a phase value and a gain value of a known beam. In one embodiment, the beamformer IC can use the index to identify the phase value and the gain value of the known beam by identifying the phase value and the gain value of the known beam in a beam dictionary. Process 1200 can proceed from block 1204 to block 1206. At block 1206, the beamformer IC can receive at least one static configuration of the antenna. In one embodiment, the at least one static configuration can include a physical location of the antenna with respect to the phased array.

Process 1200 can proceed from block 1206 to block 1208. At block 1208, the beamformer IC can receive at least one beam transformation parameter. Process 1200 can proceed from block 1208 to block 1210. At block 1210, the beamformer IC can transform, based on the at least one beam transformation parameter and the at least one static configuration, the phase value and the gain value of the known beam into a phase value and a gain value of a desired beam. Process 1200 can proceed from block 1210 to block 1212. At block 1212, the beamformer IC can map the phase value of the desired beam to a phase shifter setting of the antenna and map the gain value of the desired beam to a variable gain amplifier (VGA) setting of the antenna to generate the desired beam.

In one embodiment, the at least one beam transformation parameter can include at least a steering parameter for steering the known beam to a desired direction. In one embodiment, the at least one beam transformation parameter can include at least a windowing parameter for reducing sidelobes of the known beam. In one embodiment, the at least one beam transformation parameter can include at least a finite impulse response (FIR) filter parameter for filtering specific directions of the known beam. In one embodiment, the at least one beam transformation parameter can include at least a linear combination parameter for combining the known beam with another known beam to form the desired beam.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving an index associated with an antenna among a plurality of antennas in a phased array;
identifying, using the index, at least a phase value and a gain value of a known beam;
receiving at least one static configuration of the antenna;
receiving at least one beam transformation parameter;
transforming, based on the at least one beam transformation parameter and the at least one static configuration, the phase value and the gain value of the known beam into a phase value and a gain value of a desired beam; and
mapping the phase value of the desired beam to a phase shifter setting of the antenna and mapping the gain value of the desired beam to a variable gain amplifier (VGA) setting of the antenna to generate the desired beam.

2. The method of claim 1, wherein the at least one static configuration includes a physical location of the antenna with respect to the phased array.

3. The method of claim 1, wherein identifying, using the index, at least the phase value and the gain value of the known beam comprises identifying the phase value and the gain value of the known beam in a beam dictionary.

4. The method of claim 1, wherein the at least one beam transformation parameter includes at least a steering parameter for steering the known beam to a desired direction.

5. The method of claim 1, wherein the at least one beam transformation parameter includes at least a windowing parameter for reducing sidelobes of the known beam.

6. The method of claim 1, wherein the at least one beam transformation parameter includes at least a finite impulse response (FIR) filter parameter for filtering specific directions of the known beam.

7. The method of claim 1, wherein the at least one beam transformation parameter includes at least a linear combination parameter for combining the known beam with another known beam to form the desired beam.

8. An integrated circuit comprising:
a beam dictionary configured to store beam settings of a plurality of known beams;
a mapper connected to an antenna among a phased array;
a circuit configured to:
receive an index that identifies a location of a beam setting in the beam dictionary, wherein the beam setting identified using the index includes at least a phase value and a gain value of a known beam;
receive at least one static configuration of the antenna;
receive at least one beam transformation parameter;
transform, based on the at least one beam transformation parameter and the at least one static configuration, the phase value and the gain value of the known beam into a phase value and a gain value of a desired beam;
send the phase value and the gain value of the desired beam to the mapper;
the mapper is configured to map the phase value of the desired beam to a phase shifter setting of the antenna and map the gain value of the desired beam to a variable gain amplifier (VGA) setting of the antenna to generate the desired beam.

9. The integrated circuit of claim 8, wherein the at least one static configuration includes at least a physical location of the antenna with respect to the phased array.

10. The integrated circuit of claim 8, wherein the at least one beam transformation parameter includes at least a steering parameter for steering the known beam to a desired direction.

11. The integrated circuit of claim 8, wherein the at least one beam transformation parameter includes at least a windowing parameter for reducing sidelobes of the known beam.

12. The integrated circuit of claim 8, wherein the at least one beam transformation parameter includes at least a finite impulse response (FIR) filter parameter for filtering specific directions of the known beam.

13. The integrated circuit of claim 8, wherein the at least one beam transformation parameter includes at least a linear combination parameter for combining the known beam with another known beam to form the desired beam.

14. The integrated circuit of claim 8, wherein the beam settings of the plurality of known beams stored in the beam dictionary comprise a plurality of gain values of the plurality of known beams and a predefined phase value.

15. The integrated circuit of claim 8, wherein the beam settings of the plurality of known beams stored in the beam dictionary comprise a plurality of phase values of the plurality of known beams and a predefined gain value.

16. A system comprising:
a plurality of beamformer integrated circuits (ICs) connected to a plurality of antennas in a phased array, wherein each one of the plurality of beamformer ICs is connected to a group of antennas among the plurality of antennas;
a processor configured to:
broadcast a plurality of indices to the plurality of beamformer ICs;
broadcast a plurality of beam transformation parameters to the plurality of beamformer ICs;
each one of the beamformer ICs comprises:
a beam dictionary configured to store beam settings of a plurality of known beams;
a mapper connected to an antenna among the group of antennas;
a circuit configured to:
receive an index among the plurality of indices, wherein the index identifies a location of a beam setting in the beam dictionary and the beam setting identified using the received index includes at least a phase value and a gain value of a known beam;
receive at least one static configuration corresponding to the group of antennas connected to the beamformer IC;
receive at least one beam transformation parameter among the plurality of beam transformation parameters;
transform, based on the at least one beam transformation parameter and the static configuration, the phase value and the gain value of the known beam into a phase value and a gain value of a desired beam;
send the phase value and the gain value of the desired beam to the mapper;
the mapper is configured to map the phase value of the desired beam to a phase shifter setting of the antenna and map the gain value of the desired beam to a variable gain amplifier (VGA) setting of the antenna to generate the desired beam.

17. The system of claim 16, wherein the processor is configured to decompose a spatial filter of the desired beam into the known beam and the at least one beam transformation parameter.

18. The system of claim 16, wherein the at least one static configuration includes locations of the plurality of antennas in the phased array.

19. The system of claim 16, wherein the beam settings of the plurality of known beams stored in the beam dictionary comprise a plurality of gain values of the plurality of known beams and a predefined phase value.

20. The system of claim 16, wherein the beam settings of the plurality of known beams stored in the beam dictionary comprise a plurality of phase values of the plurality of known beams and a predefined gain value.

* * * * *